United States Patent [19]

Azuma et al.

[11] Patent Number: 4,510,011
[45] Date of Patent: Apr. 9, 1985

[54] STRIP DEFORMING APPARATUS

[75] Inventors: Yusaku Azuma; Yoshifumi Kitayama, both of Kodaira; Shinji Kawaida, Shimonoseki, all of Japan

[73] Assignee: Bridgestone Tire Company Limited, Tokyo, Japan

[21] Appl. No.: 565,176

[22] Filed: Dec. 23, 1983

[30] Foreign Application Priority Data

Dec. 28, 1982 [JP] Japan .................. 57-234593

[51] Int. Cl.³ ............................................. B32B 31/00
[52] U.S. Cl. .................................................. 156/407
[58] Field of Search ............... 156/407, 394.1, 412, 156/421, 443

[56] References Cited

U.S. PATENT DOCUMENTS 3,551,253  12/1970  Slezak ................. 156/407

Primary Examiner—David Simmons
Attorney, Agent, or Firm—Cushman, Darby & Cushman

[57] ABSTRACT

A strip deforming apparatus for deforming a flexible strip into a looped endless band, comprising a first conveyor assembly comprising an endless belt having an upper travelling path, a second conveyor assembly positioned below the first conveyor assembly and comprising an endless belt having an upper travelling path parallel with and spaced apart downwardly from the belt of the first conveyor assembly, and a third conveyor assembly positoned between the first and second conveyor assemblies and comprising a pair of conveyor rolls elongated in longitudinal directions of the apparatus and each rotatable about the center axis thereof. At least one of the first and second conveyor assemblies is movable toward and away from the other conveyor assembly and the conveyor rolls are spaced apart in parallel from each other in a lateral direction of the apparatus. The belt of the first conveyor assembly is driven to travel in a lateral direction of the apparatus and the belt of the second conveyor assembly is driven to travel in a direction opposite to the direction of travel of the belt of the first conveyor assembly. The third conveyor assembly is driven to move vertically between the first and second conveyor assemblies and the conveyor rolls of the third conveyor assembly are driven to move toward and away from each other in a lateral direction of the apparatus.

10 Claims, 12 Drawing Figures

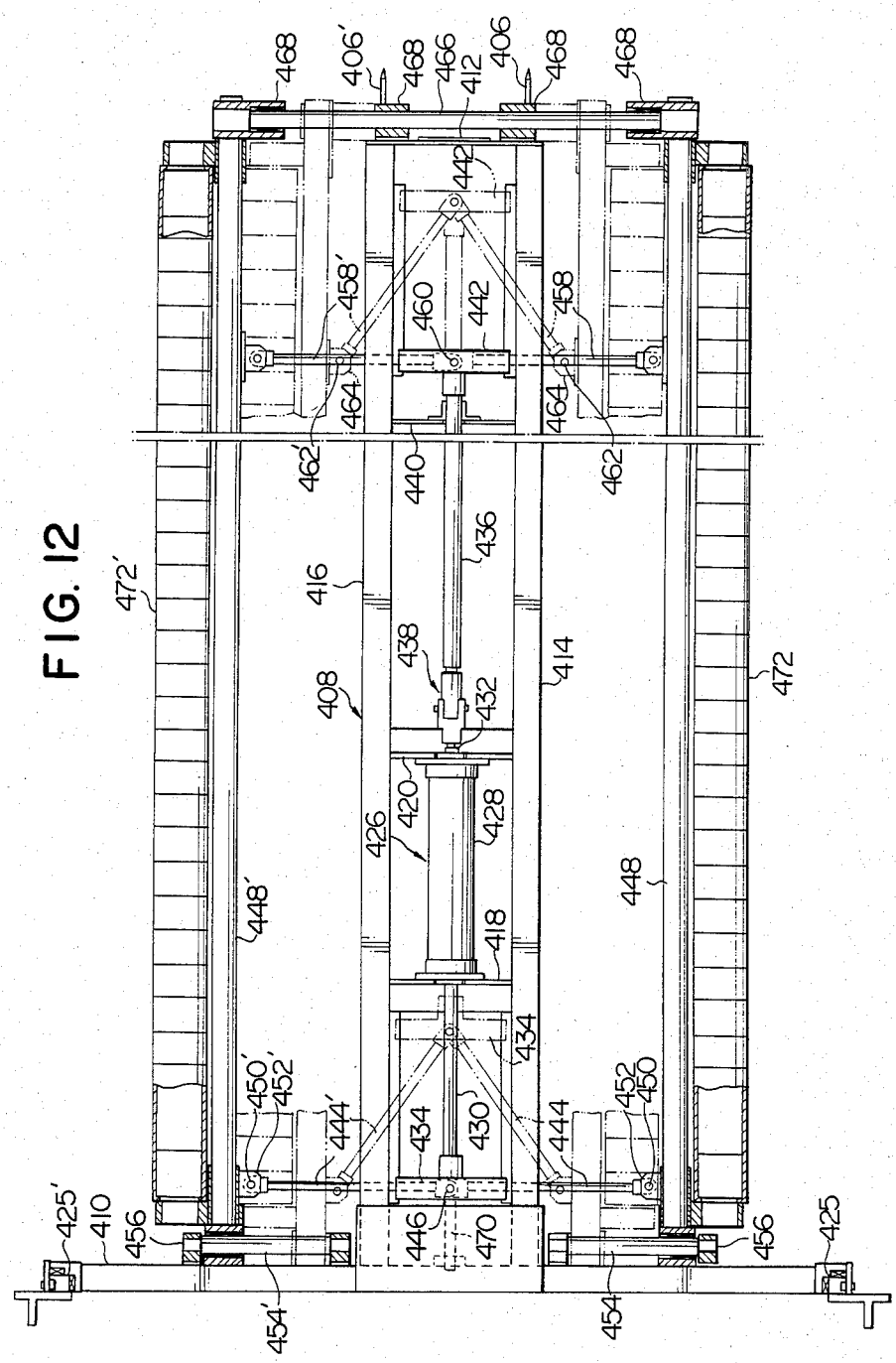

STRIP DEFORMING APPARATUS

FIELD OF THE INVENTION

The present invention relates to a strip deforming apparatus for deforming a flexible strip into a looped endless band and, more particularly, to an apparatus for deforming a flexible strip of unvulcanized rubber into a looped endless tire band to form part of a pneumatic tire.

SUMMARY OF THE INVENTION

In accordance with the present invention, there is provided a strip deforming apparatus for deforming a flexible strip into a looped endless band, comprising a frame structure having longitudinal and lateral directions; a first conveyor assembly comprising an endless belt having an upper travelling path portion; a second conveyor assembly positioned below the first conveyor assembly and comprising an endless belt having an upper travelling path portion substantially parallel with and spaced apart downwardly from the endless belt of the first conveyor assembly; at least one of the first and second conveyor assemblies being vertically movable toward and away from the other of the conveyor assemblies, a third conveyor assembly positioned vertically between the first and second conveyor assemblies and comprising a pair of conveyor rolls elongated in longitudinal directions of the apparatus and each rotatable about the center axis thereof, the conveyor rolls being spaced apart substantially in parallel from each other in a lateral direction of the frame structure; first conveyor drive means operative to drive at least one of the first and second conveyor assemblies vertically toward and away from the other of the first and second conveyor assemblies; second conveyor drive means operative to drive the endless belt of the first conveyor assembly to travel in a lateral direction of the frame structure; third conveyor drive means operative to drive the endless belt of the second conveyor assembly to travel in a direction opposite to the direction of travel of the endless belt of the first conveyor assembly; and fourth conveyor drive means operative to drive the third conveyor assembly to move vertically between the first and second conveyor assemblies and comprising roll drive means operative to drive the conveyor rolls of the third conveyor assembly to move toward and away from each other in a lateral direction of the frame structure. The strip deforming apparatus according to the present invention may further comprise a pair of lift structures spaced apart in parallel from each other in a longitudinal direction of the frame structure and vertically movable below the first conveyor assembly, the second conveyor assembly being supported on the lift structures and the first conveyor drive means being operative to drive the lift structures vertically toward and away from the first conveyor assembly. In this instance, each of the first and second conveyor assemblies may further comprise a pair of conveyor rolls which are elongated substantially in parallel with the conveyor rolls of the third conveyor assembly and swhich are paced apart from each other in a lateral direction of the frame structure and which have the endless belt of each of the first and second conveyor assemblies passed therebetween.

BRIEF DESCRIPTION OF THE DRAWINGS

The drawbacks of a prior-art strip deforming apparatus and the features and advantages of a strip deforming apparatus according to the present invention will be more clearly understood from the following description taken in conjunction with the accompanying drawings in which:

FIG. 12 is a plan view of the third or intermediate conveyor assembly of the apparatus embodying the present invention.

DESCRIPTION OF THE PRIOR ART

Figure 1:
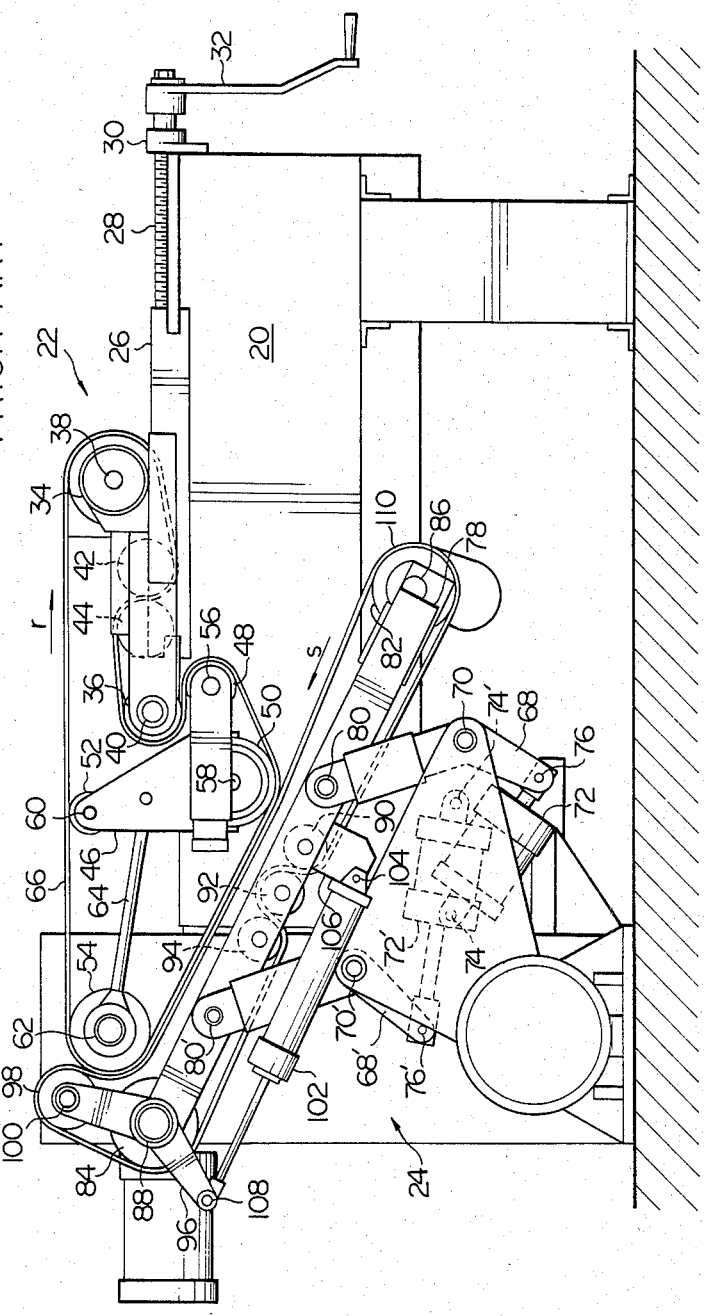
FIG. 1 is a side elevation view showing an example of a prior-art strip deforming apparatus of the kind to which the present invention appertains.

An example of a conventional strip deforming apparatus is shown in Japanese Patent Publication No. 47-19115. FIG. 1 of the drawings shows the general construction and arrangement of the prior-art strip deforming apparatus disclosed in this Japanese Patent Publication No. 47-19115. As shown, the known strip deforming apparatus is largely composed of a frame structure 20 installed on a floor surface and first and second conveyor assemblies 22 and 24 supported on the frame structure 20. The first conveyor assembly 22 includes a horizontally extending slidable roller carrier 26 which is slidably mounted on the frame structure 20. The slidable roller carrier 26 has incorporated therein an internally threaded nut member (not shown) which is engaged by an elongated screw rod 28 having an end portion rotatably supported in a bracket member 30 securely attached to the frame structure 20. The slidable roller carrier 26 is thus longitudinally movable back and forth on the frame structure 20 as the screw rod 28 is driven for rotation about the center axis thereof. The end portion of the screw rod 28 axially projects from the bracket member 30 and is securely connected to a handle 32 so that the screw rod 28 is driven for rotation about the center axis thereof when the handle 32 is manually turned by an operator. The slidable roller carrier 26 has carried thereon first and second guide rollers 34 and 36 rotatably supported on the roller carrier 26 by means of roller shafts 38 and 40, respectively, which are spaced apart from each other. The roller shafts 38 and 40 thus supporting the first and second guide rollers 34 and 36, respectively, are parallel with each other in directions perpendicular to the direction in which the roller carrier 26 is movable on the frame structure 20. Between the first and second guide rollers 34 and 36 are positioned third and fourth guide rollers 42 and 44 each serving as a track roller. The third and fourth guide rollers 42 and 44 are positioned adjacent each other between the first and second guide rollers 34 and 36 and are supported on the slidable roller carrier 26 by means of roller shafts (not shown) which extend in parallel with the roller shafts 38 and 40 of the guide rollers 34 and 36, respectively. The first conveyor assembly 22 further comprises a stationary roller carrier 46 securely mounted on the frame structure 20 and having fifth, sixth drive and seventh guide rollers 48, 50 and 52 and a drive roller 54 carried thereon. The fifth, sixth and seventh guide rollers 48, 50 and 52 and the drive roller 54 are supported on the stationary roller carrier 46 by roller shafts 56, 58, 60 and 62, respectively, which are all parallel with the roller shafts 38 and 40 of the first and second guide rollers 34 and 36. The fifth guide roller 48 is positioned adjacent the second guide roller 40 on the slidable roller carrier 26. The roller shaft 62 of the drive roller 54 is mounted on a guide roller support rod 64 which is cantilevered to the stationary roller carrier 46 and which extends opposite to the slidable roller carrier 26. The drive roller 54 is connected to drive means (not shown) and is thus adapted to be driven for rotation about the center axis of the roller shaft 62. The first and sixth guide rollers 34 and 50 and the drive roller 54 are positioned so that the respective center axes of the roller shafts 38, 58 and 62 thereof are located at the vertices of a triangle having a base on a horizontal plane which passes through the center axes of the roller shafts 38 and 62 of the first guide roller 34 and the drive roller 54. The slidable roller carrier 26 is thus adapted to vary the distance between the center axes of the roller shafts 38 and 58 of the first and sixth guide rollers 34 and 50 and the distance between the center axes of the roller shafts 38 and 62 of the first guide roller and drive roller 54. An endless belt 66 is passed on the rollers 34, 36, 42, 44, 48, 50, 52 and 54 and has a horizontal travelling path portion extending from the drive roller 54 to the first guide roller 34 across the seventh guide roller 52. The endless belt 66 further has an upwardly inclined travelling path portion extending from the sixth guide roller 50 to the drive roller 54. The positions of the first to fourth guide rollers 34, 36, 42 and 44 with respect to the fifth to seventh guide rollers 48, 50, 54 and 52 are variable by moving the slidable roller carrier 26 on the frame structure 20 depending upon the circumferential length of the tire bands to be formed. When the positions of the first to fourth guide rollers 34, 36, 42 and 44 are thus varied with respect to the fifth to seventh guide rollers 48, 50 and 52 and the drive roller 54, there is no change in the tension in the endless belt 66 since all of the movable guide rollers 34, 36, 42 and 44 are moved equal distances with respect to the frame structure 20.

On the other hand, the second conveyor assembly 24 comprises first and second bell-crank levers 68 and 68' having respective intermediate fulcrum portions pivotally connected to the frame structure 20 by pivot pins 70 and 70', respectively. The pivot pins 70 and 70' are spaced apart from each other and have center axes parallel with the axes of rotation of the guide rollers 34, 36, 42, 44, 48, 50, 52 and 54 of the first conveyor assembly 22. The bell-crank levers 68 and 68' are connected to the frame structure 20 by means of fluid-operated power cylinders 72 and 72', respectively, which are mounted on the frame structure 20. The power cylinder 72 associated with the first bell-crank lever 68 has a cylinder body pivotally jointed to the frame structure 20 by a pivot pin 74, and a piston rod pivotally connected to one arm portion of the bell-crank lever 68 by a pivot pin 76. Likewise, the power cylinder 72' associated with the second bell-crank lever 68' has a cylinder body pivotally jointed to the frame structure 20 by a pivot pin 74', and a piston rod pivotally connected to one arm portion of the bell-crank lever 68' by a pivot pin 76'. The other arm portions of the bell-crank levers 68 and 68' are pivotally connected to an elongated movable roller carrier 78 by means of pivot pins 80 and 80', respectively. The movable roller carrier 78 extends in parallel with the above mentioned upwardly inclined travelling path portion of the endless belt 66 of the first conveyor assembly 22 as shown. As the bell-crank levers 68 and 68' are driven by the power cylinders 72 and 72' for rotation about the center axes of the pivot pins 70 and 70', respectively, the movable roller carrier 78 of the second conveyor assembly 24 is caused to move toward and away from the particular travelling path portion of the belt 66. The movable roller carrier 78 has carried thereon a drive roller 82 and a first guide roller 84 by means of roller shafts 86 and 88, respectively, which are located at the opposite ends of the carrier 78 and which have center axes parallel with the axes of rotation of the guide rollers 34, 36, 42, 44, 48, 50, 52 and 54 of the first conveyor assembly 22. The drive roller 82 is connected to drive means (not shown) and is thus adapted to be driven for rotation about the center axis of the roller shaft 86. The speed of rotation of the drive roller 82 thus driven is slightly higher than the speed of rotation of the drive roller 54 of the first conveyor assembly 22. Between the rollers 82 and 84 on the movable roller carrier 78 are positioned second, third and fourth guide rollers 90, 92 and 94 each serving as a track roller. These guide rollers 90, 92 and 94 are positioned adjacent each other between the drive roller 82 and the first guide roller 84 and are supported on the roller carrier 78 by means of roller shafts (not shown) which extend in parallel with the roller shafts 86 and 88 of the rollers 82 and 84, respectively. The movable roller carrier 78 has further mounted thereon a third bell crank lever 96 by means of the roller shaft 88 carrying the first guide roller 84. The third bell-crank lever 96 is thus rockable about the center axis of the roller shaft 88 and has a roll-up roller 98 mounted on one arm portion thereof by a pivot pin 100, the roll-up roller 98 being positioned adjacent the drive roller 54 of the first conveyor assembly 22. The third bell-crank lever 96 is driven to rock about the center axis of the roller shaft 88 by means of a fluid-operated power cylinder 102 having a cylinder body pivotally connected to the movable roller carrier 78 by a pivot pin 104 carried by a bracket member 106 secured to the roller carrier 78. The power cylinder 102 further has a piston rod pivotally connected at its leading end to the other arm portion of the third bell-crank lever 96 by a pivot pin 108. The roll-up roller 98 is thus moved toward and away from the drive roller of the first conveyor assembly 22 when the piston rod of the power cylinder 102 is driven to project or retract and as a consequence the bell-crank lever 96 is caused to turn in either direction about the center axis of the roller shaft 88. An endless belt 110 is passed on the drive roller 82, first to fourth guide rollers 84, 90, 92 and 94 and roll-up roller 98. The endless belt 110 has a downwardly inclined travelling path portion extending from the roll-up roller 98 to the drive roller 82 along the upwardly inclined travelling path portion of the endless belt 66 of the first conveyor assembly 22.

Before the strip deforming apparatus thus constructed and arranged is put into operation, the positions of the first to fourth guide rollers 34, 36, 42 and 44 of the first conveyor assembly 22 are adjusted with respect to the fifth to seventh guide rollers 48, 50 and 52 and drive roller 54 on the stationary roller carrier 46 depending upon the circumferential length of the tire bands to be formed. For this purpose, the handle 32 is manually turned until the rollers 34, 36, 42 and 44 on the slidable roller carrier 26 reach the desired positions with respect to the rollers 48, 50, 52 and 54. When the positions of the guide rollers 34, 36, 42 and 44 are thus varied with respect to the rollers 48, 50, 52 and 54, the tension in the endless belt 66 is maintained unchanged since all of the movable guide rollers 34, 36, 42 and 44 are moved equal distances with respect to the frame structure 20 as previously noted. The power cylinders 72 and 72' of the second conveyor assembly 24 are then actuated to drive the first and second bell-crank levers 68 and 68', respectively, to turn clockwise in FIG. 1 about the center axes of the pivot elements 70 and 70', respectively. This causes the endless belt 110 of the second conveyor assembly 24 to contact the endless belt 66 of the first conveyor assembly 22 along the upwardly inclined travelling path portion of the belt 66 and the downwardly inclined travelling path portion of the belt 110 as shown. Furthermore, the power cylinder 102 of the second conveyor assembly 24 is actuated to drive the third bell-crank lever 96 to turn counter clockwise in FIG. 1 about the center axis of the roller shaft 88 so as to cause the roll-up roller 98 to move away from the drive roller 54 of the first conveyor assembly 22. A band-forming strip of unvulcanized rubber is then placed on the endless belt 66 of the first conveyor assembly 22 along the horizontal travelling path portion of the belt 66 extending from the drive roller 54 to the first guide roller 34 across the seventh guide roller 52.

The drive means associated with the drive roller 54 of the first conveyor assembly 22 is now actuated to drive the drive roller 54 for rotation about the center axis of the roller shaft 62 clockwise in FIG. 1. Furthermore, the drive means associated with the drive roller 82 of the second conveyor assembly 24 is actuated to drive the drive roller 82 for rotation about the center axis of the roller shaft 86 counter-clockwise in FIG. 1 at a speed slightly higher than the speed at which the drive roller 54 of the first conveyor assembly 22 is driven for rotation. The endless belt 66 of the first conveyor assembly 22 is thus driven to travel in a direction indicated by an arrow r on the guide rollers 34, 36, 42, 44, 48, 50 and 52 and the drive roller 54, and the endless belt 110 of the second conveyor assembly 24 is driven to travel in a direction indicated by an arrow s on the drive roller 82, guide rollers 84, 90, 92 and 94 and roll-up roller 98. The band-forming strip placed on the endless belt 66 along the horizontal travelling path portion of the belt 66 is accordingly caused to travel past the first guide roller 34 to the second guide roller 40 through the third and fourth guide rollers 42 and 44 and further from the fifth guide roller 48 to the sixth guide roller 50. Past the sixth guide roller 50, the band-forming strip is interposed between the endless belts 66 and 110 of the first and second conveyor assemblies 22 and 24. At a point of time when the leading end of the band-forming strip thus interposed between the endless belts 66 and 110 reaches the location between the drive roller 54 of the first conveyor assembly 22 and the roll-up roller 98 of the second conveyor assembly 24, the power cylinder 102 is actuated to drive the third bell-crank lever 96 to turn clockwise in FIG. 1 about the center axis of the roller shaft 88 so that the roll-up roller 98 is brought into engagement with the drive roller 54 across the endless belts 66 and 110. Thus, the band-forming strip travelling between the endless belts 66 and 110 is interposed between the drive roller 54 of the first conveyor assembly 22 and the roll-up roller 98 of the second conveyor assembly 24 and has its leading end portion withdrawn from between the endless belts 66 and 110. The leading end portion of the band-forming strip thus withdrawn from the belts 66 and 110 is directed over the horizontal travelling path portion of the belt 66 toward the leading end of the path, viz., toward the operator standing in front of the strip deforming apparatus. While the band-forming strip is travelling between the endless belts 66 and 110, the endless belt 110 of the second conveyor assembly 24 is driven to travel at a speed higher than the speed at which the endless belt 66 of the first conveyor assembly 22 is driven to travel. The band-forming strip is for this reason permitted to travel between the two endless belts 66 and 110 without being elongated along the belts 66 and 110. The leading end portion of the band-forming strip withdrawn from the belts 66 and 110 and directed toward the leading end of the path is joined by suitable means (not shown) to a trailing end portion of the band-forming strip on the endless belt 66 along the horizontal travelling path portion of the belt 66, thereby forming a looped tire band. After the looped tire band is in this fashion formed, the power cylinder 102 associated with the third bell-crank lever 96 of the second conveyor assembly 22 is actuated to drive the bell-crank lever 96 to turn counterclockwise in FIG. 1 about the center axis of the roller shaft 88 so that the roll-up roller 98 is caused to move away from the drive roller 54 of the first conveyor assembly 22 to permit the formed tire band to be withdrawn from the endless belts 66 and 110. A number of looped tire bands are formed by repetition of the above described cycle of operation.

Problems are encountered in producing tire bands on a prior-art strip deforming apparatus of the above described kind. As noted previously, the respective axes of rotation of the rollers 34, 50 and 54 of the first conveyor assembly 22 are located at the vertices of a triangle having a base on a horizontal plane which passes through the axes of rotation of the rollers 34 and 54. The slidable roller carrier 26 of the first conveyor assembly 22 is thus adapted to vary the the total length of the bases of such a triangle depending upon the circumferential length of the tire bands to be formed. In this instance, the total length of the bases of the triangle varies with the distance of movement of the slidable roller carrier 26 on the frame structure 20. Whereas, the slidable roller carrier 26 is permitted to move along the screw rod 28 between a limit position contacted by the bracket member 30 on the frame structure 20 and a limit position dictated by the distance of movement of the second guide roller 36 allowed to move within the above mentioned triangle. These limit positions of the roller carrier 26 determine the maximum distance of movement of the roller carrier 26 with respect to the frame structure 20 and accordingly the maximum circumferential length of tire bands which can be formed by the apparatus.

When, furthermore, tire bands with a relatively large circumferential length are to be produced, the slidable roller carrier 26 and accordingly the rollers carried thereon are positioned in the neighborhood of the front end of the frame structure 20 and may hinder the operator working in front of the apparatus. It may also be pointed out that the provision of a number of rollers will also result in intricate and costly construction of the apparatus as a whole.

The present invention contemplates provision of useful solutions to these problems encountered in the prior-art strip deforming apparatus of the described kind.

DESCRIPTION OF THE PREFERRED EMBODIMENT

Figure 2:
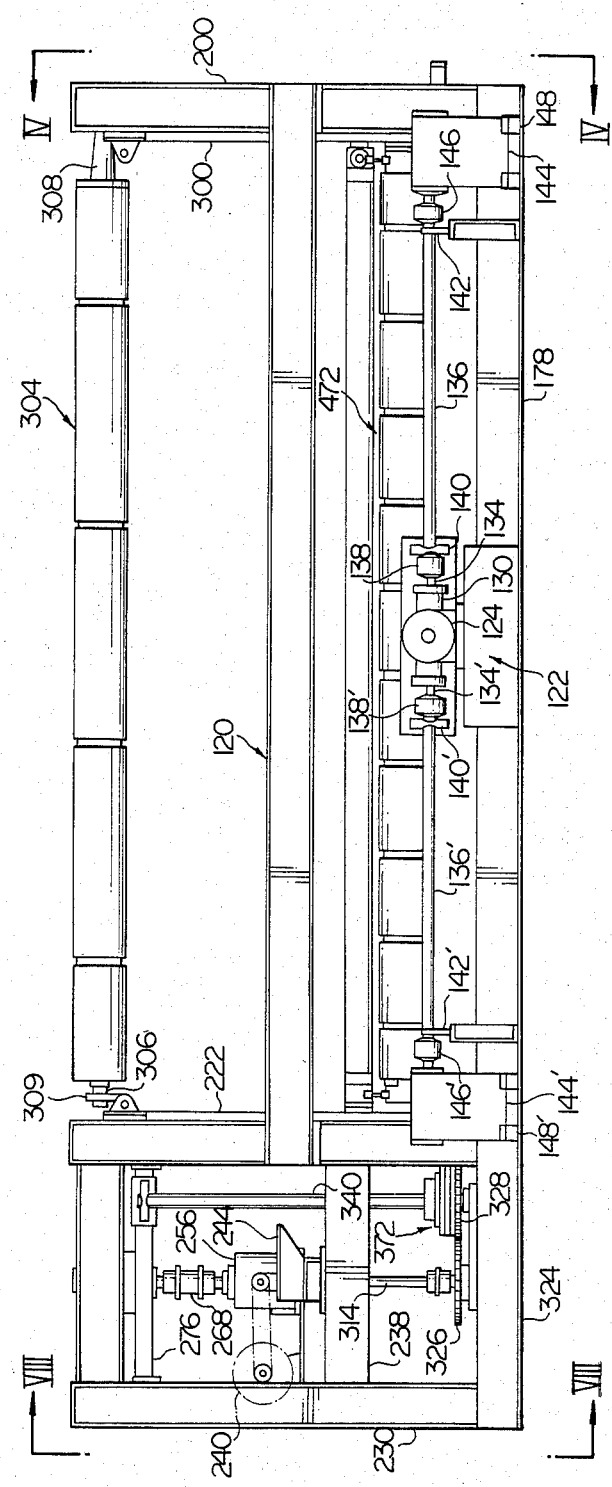
FIG. 2 is a front elevation view of a preferred embodiment of a strip deforming apparatus according to the present invention.
Figure 3:
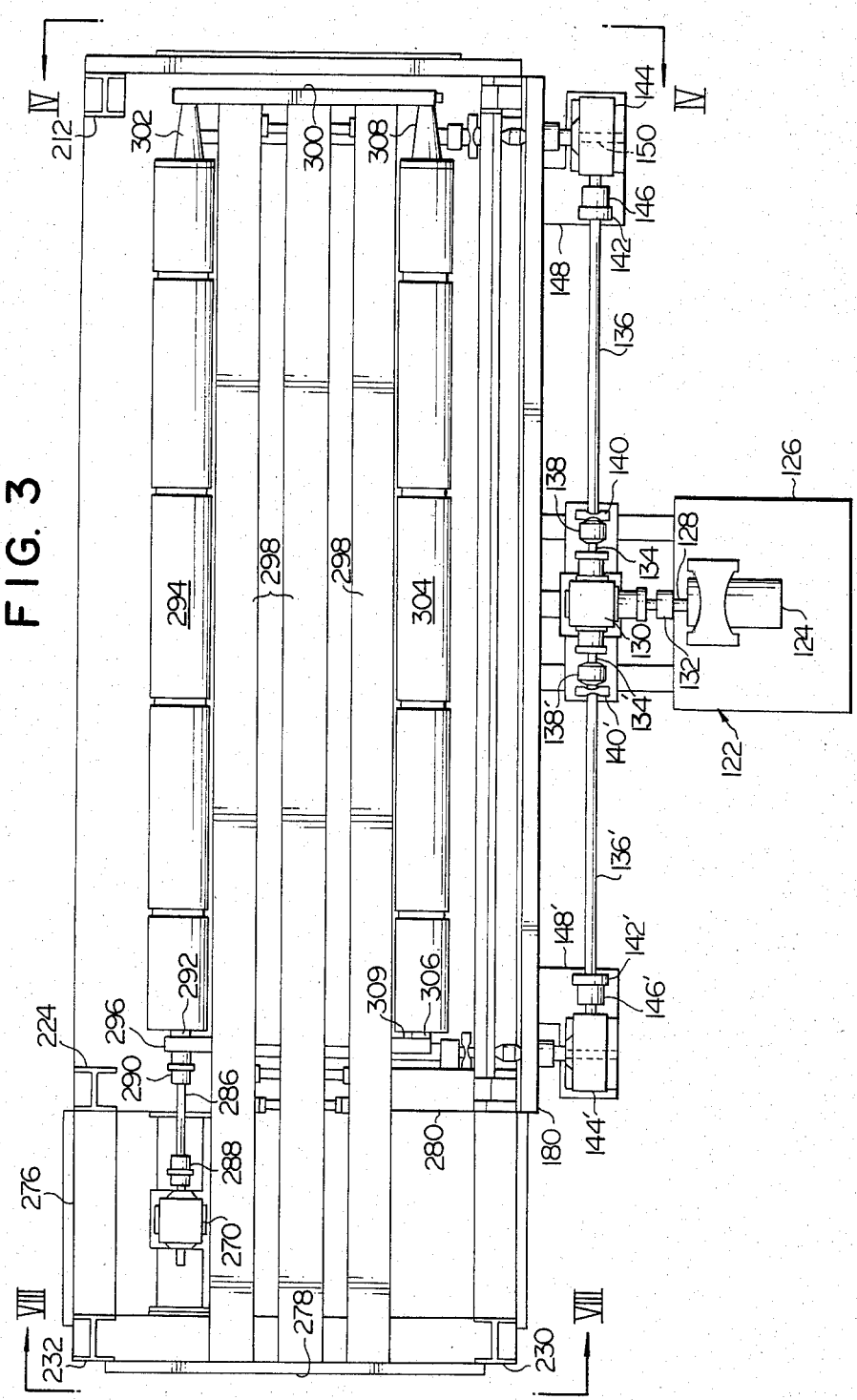
FIG. 3 is a plan view of the strip deforming apparatus shown in FIG. 2.

Referring to FIGS. 2 and 3 of the drawings, a strip deforming apparatus embodying the present invention comprises a frame structure 120 installed on a horizontal floor surface and consisting of various horizontal beams and vertical columns each constituted by, for example, an H-beam. In front of the frame structure 120 is positioned a main drive assembly 122 as will be better seen in FIG. 3. The main drive assembly 122 comprises a reversible motor 124 mounted on a base block 126 and having an output shaft 128 extending in a lateral direction of the apparatus. The output shaft 128 of the motor 124 is connected at its leading to a main bevel gear unit 130 by means of a coupling unit 132 which is positioned between the frame structure 120 and the motor 124. Though not shown in the drawings, the main bevel gear unit 130 comprises an input bevel gear carried on a shaft axially aligned with and connected to the output shaft 128 of the motor 124 through the coupling unit 132, and a pair of output bevel gears jointly engaging the input bevel gear. The output bevel gears of the bevel gear unit 130 are respectively carried on shafts 134 and 134' axially aligned with each other in a longitudinal direction of the apparatus. These shafts 134 and 134' are connected at their leading ends to first and second elongated drive shafts 136 and 136' through couplings 138 and 138', respectively. The first drive shaft 136 has opposite axial end portions rotatably supported in bearing blocks 140 and 142, respectively, and is connected at its end opposite to the coupling unit 138 to a first auxiliary bevel gear unit 144 through a coupling unit 146. Likewise, the second drive shaft 136' has opposite axial end portions rotatably supported in bearing blocks 140' and 142', respectively, and is connected at its end opposite to the coupling unit 138' to a second auxiliary bevel gear unit 144' through a coupling unit 146'. The first and second bevel gear units 144 and 144' are also positioned in front of the frame structure 120 and are mounted on base blocks 148 and 148', respectively, placed on the floor surface. Though not shown in the drawings, the first auxiliary bevel gear unit 144 comprises an input bevel gear carried on a shaft axially aligned with and connected to the first drive shaft 136 through the coupling unit 146, and an output bevel gear engaging the input bevel gear. Similarly, the second auxiliary bevel gear unit 144' comprises an input bevel gear carried on a shaft axially aligned with and connected to the second drive shaft 136' through the coupling unit 146', and an output bevel gear engaging the input bevel gear. Thus, the power output delivered from the motor 124 to the main bevel gear unit 130 through the coupling unit 132 is split into two driving power components. One of these two driving power components is transmitted to the input bevel gear of the first auxiliary bevel gear unit 144 through the coupling unit 138, first drive shaft 136 and coupling unit 146 and the other driving power component is transmitted to the input bevel gear of the second auxiliary bevel gear unit 144' through the coupling unit 138', second drive shaft 136' and coupling unit 146'. The output bevel gears of the first and second auxiliary bevel gear units 144 and 144' are respectively carried on shafts 150 and 150' axially extending in lateral directions of the apparatus as will be seen from FIG. 3.

Figure 4:
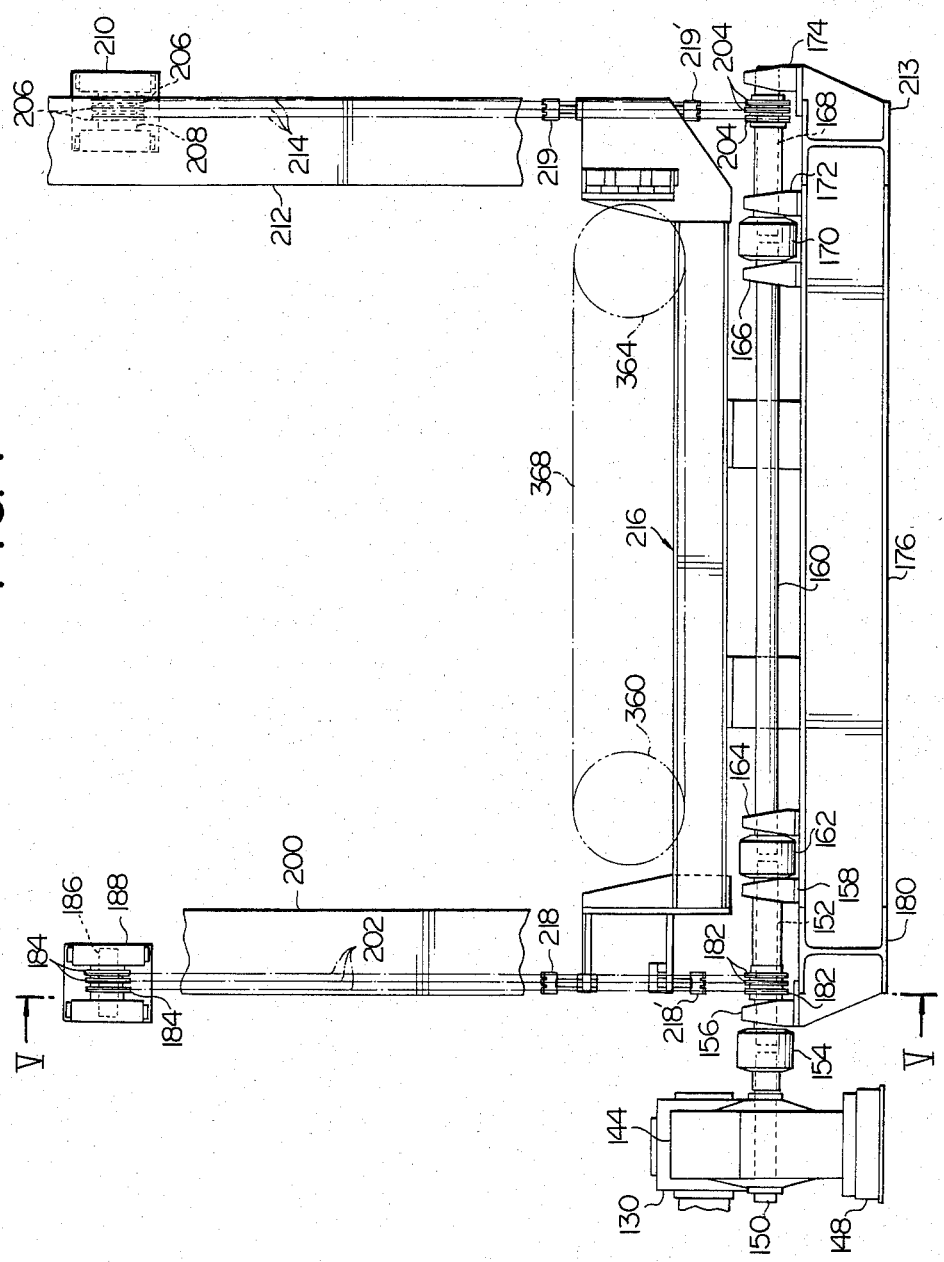
FIG. 4 is a side elevation view showing, to an enlarged scale, part of the drive means for a first or upper conveyor assembly of the strip deforming apparatus embodying the present invention, the drive means being viewed from a vertical plane indicated by lines IV—IV in FIGS. 1 and 2.

Turning to FIG. 4 of the drawings, the shaft 150 carrying the output bevel gear of the first auxiliary bevel gear unit 144 is connected at its leading end to a front drive shaft 152 by means of a coupling unit 154. The front drive shaft 152 has its opposite axial end portions rotatably supported in bearing blocks 156 and 158, respectively, and is connected at its leading end to an intermediate drive shaft 160 by means of a coupling unit 162. The intermediate drive shaft 160 in turn has its opposite axial end portions rotatably supported in bearing blocks 164 and 166, respectively and is connected at its leading end to a rear drive shaft 168 by means of a coupling unit 170. The driving power component transmitted to the first auxiliary bevel gear unit 144 is thus carried to the drive shafts 152, 160 and 168 through the shaft 150 carrying the output bevel gear of the bevel gear unit 144 and drives the shafts 152, 160 and 168 for rotation about the aligned center axes thereof with respect to the frame structure 120. The coupling units 154, 162 and 170 providing connections between the shafts 150, 152, 160 and 168 and the bearing blocks 156, 158, 164, 166, 172 and 174 supporting the shafts 150, 152, 160 and 168 are positioned in alignment with each other in a lateral direction of the apparatus so that the drive shafts 152, 160 and 168 are axially aligned with the shaft 150 carrying the output bevel gear of the first auxiliary bevel gear unit 144. Furthermore, the coupling units 162 and 170 and the bearing blocks 156, 158, 164, 166, 172 and 174 are fixedly mounted on a horizontal lower cross member 176 forming part of the frame structure 120 and extending in a lateral direction of the apparatus. The lower cross member 176 lies on the floor surface and is located at one longitudinal end of the apparatus.

Though not shown in the drawings, the shaft 150' of the second auxiliary bevel gear unit 144' is also connected to front, intermediate and rear drive shafts arranged similarly to the above described shafts 152, 160 and 168 connected to the shaft 150 of the first auxiliary bevel gear 144. The driving power component transmitted to the second auxiliary bevel gear unit 144' is thus also carried to these drive shafts through the shaft 150' carrying the output bevel gear of the bevel gear unit 144' and drives the these shafts for rotation about the aligned center axes thereof with respect to the frame structure 120. The coupling units and bearing blocks associated with these drive shafts connected to the shaft 150' of the second auxiliary bevel gear 144' are fixedly mounted on a horizontal lower cross member (shown at 178 in FIG. 6) also forming part of the frame structure 120 and extending in a lateral direction of the apparatus. The horizontal lower cross members thus carrying the drive shafts associated with the first and second auxiliary bevel gear units 144 and 144', respectively, extend in parallel with each other in lateral directions of the apparatus so that the two series of drive shafts are spaced apart a predetermined distance from each other as will be understood from the illustrations of FIGS. 2 and 3. Between front end portions of these two horizontal lower cross members is provided a horizontal lower front longitudinal member 180 which also forms part of the frame structure 120 and which extend in longitudinal directions of the apparatus as will be also seen from FIG. 4.

Figure 5:
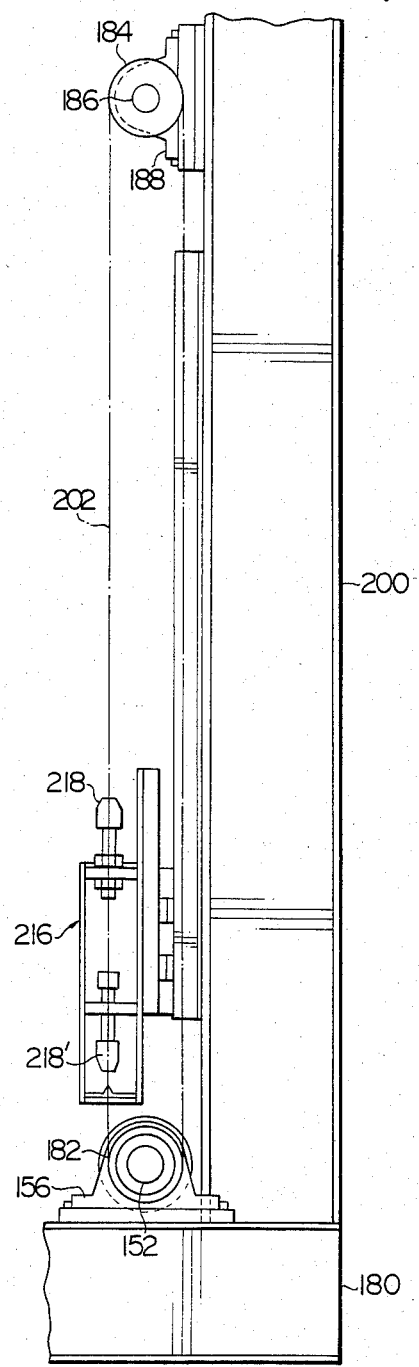
FIG. 5 is a front elevation view of the drive means illustrated in FIG. 4.

As further shown in FIGS. 4 and 5 of the drawings, the front drive shaft 152 have coaxially carried thereon three lower driving sprocket wheels 182 rotatable with the shaft 152. These lower driving sprocket wheels 182 are paired with upper driven sprocket wheels 184, respectively, which are positioned above the lower driving sprocket wheels 182. The upper driven sprocket wheels 184 are jointly carried on a shaft 186 axially extending in parallel with the lower front drive shaft 152. The shaft 186 thus carrying the upper driven sprocket wheels 184 is supported on a bracket member 188 securely attached to a vertical front column member 200 also forming part of the frame structure 120 and upstanding from one end portion of the above mentioned horizontal front longitudinal member 180. A chain 202 having opposite ends is passed between each of the lower driving sprocket wheels 182 and associated one of the upper driven sprocket wheels 184 and is vertically movable along the front column member 200. The driving power transmitted from the shaft 150 carrying the output bevel gear of the first auxiliary bevel gear unit 144 to the front drive shaft 152 is thus further transmitted from the shaft 152 to the chains 202 through the driving and driven sprocket wheels 182 and 184. Likewise, the rear drive shaft 168 has coaxially carried thereon three lower driving sprocket wheels 204 rotatable with the shaft 168. These lower driving sprocket wheels 204 are paired with upper driven sprocket wheels 206, respectively, which are positioned above the lower driving sprocket wheels 204. The upper driven sprocket wheels 206 are jointly carried on a shaft 208 axially extending in parallel with the lower front drive shaft 168. The shaft 208 thus carrying the upper driven sprocket wheels 206 is aligned with the shaft 186 carrying the upper driven sprocket wheels 184 of the front chain and sprocket arrangement in a lateral direction of the apparatus and is supported on a bracket member 210 securely attached to a vertical rear column member 212 also forming part of the frame structure 120 and upstanding from one end portion of a lower horizontal rear longitudinal member 213 of the frame srtructure 120. A chain 214 having opposite ends is passed between each of the lower driving sprocket wheels 204 and associated one of the upper driven sprocket wheels 206 and is vertically movable along the rear column member 212. The driving power transmitted from the shaft 150 carrying the output bevel gear of the first auxiliary bevel gear unit 144 to the rear drive shaft 168 through the front and intermediate drive shafts 152 and 160 is thus further transmitted from the drive shaft 168 to the chains 214 through the driving and driven sprocket wheels 204 and 206. A vertically movable lift structure 216 extends horizontally between the front and rear column members 200 and 212 of the frame structure 120 in a lateral direction of the apparatus. Each of the chains 202 of the front chain and sprocket arrangement is anchored at its opposite ends to one of opposite lateral end portion of the lift structure 216 by means of suitable fastening elements 218 and 218'. Likewise, each of the chains 214 of the rear chain and sprocket arrangement is anchored at its opposite ends to the other opposite lateral end portion of the lift structure 216 by means of fastening elements 219 and 219' as shown in FIG. 4. The lift structure 216 is thus vertically movable along the column members 200 and 212 as the chains 202 and 214 are driven to travel by means of the first auxiliary bevel gear unit 144. Though not shown in the drawings, similar front and rear chain and sprocket arrangements are provided in association with the second auxiliary bevel gear unit 144' and are drivingly connected to a lift structure 220 (FIG. 6) which is similar to the above mentioned lift structure 216. The lift structure 220 is thus vertically movable along vertical front and rear column members respectively corresponding to the front and rear column members 200 and 212 shown in FIG. 4. The front and rear column members along which the lift structure 220 is thus vertically movable are indicated at 222 and 224 in FIGS. 2 and 3, respectively, and extend upwardly from the other end portions of the previously mentioned lower front and rear longitudinal members 178 and 180, respectively, (FIG. 4).

The main drive assembly 122, main bevel gear unit 130, first and second drive shafts 136 and 136', and first and second auxiliary bevel gear units 144 and 144' as hereinbefore described form part of first conveyor drive means in a strip deforming apparatus according to the present invention. The first conveyor drive means further comprises the drive shafts 152, 160 and 168, sprocket wheels 182, 184, 204 and 206, and chains 202 and 214 associated with the first auxiliary bevel gear unit 144 as well as the the drive shafts, sprocket wheels and chains and lift structure 220 associated with the second auxiliary bevel gear unit 144'. The above described lift structures 216 and 220 are vertically movable on a common horizontal plane between predetermined lowermost and uppermost positions above the floor surface. The first conveyor drive means of the apparatus according to the present invention is thus adapted to drive the lift structures 216 and 220 to move upwardly and downwardly with respect to the frame structure 120 between these predetermined lowermost and uppermost positions above the floor surface. Each of the main and auxiliary bevel gear units 130, 144 and 144' constitutes right-angle power transfer means in the strip deforming apparatus according to the present invention.

Figure 6:
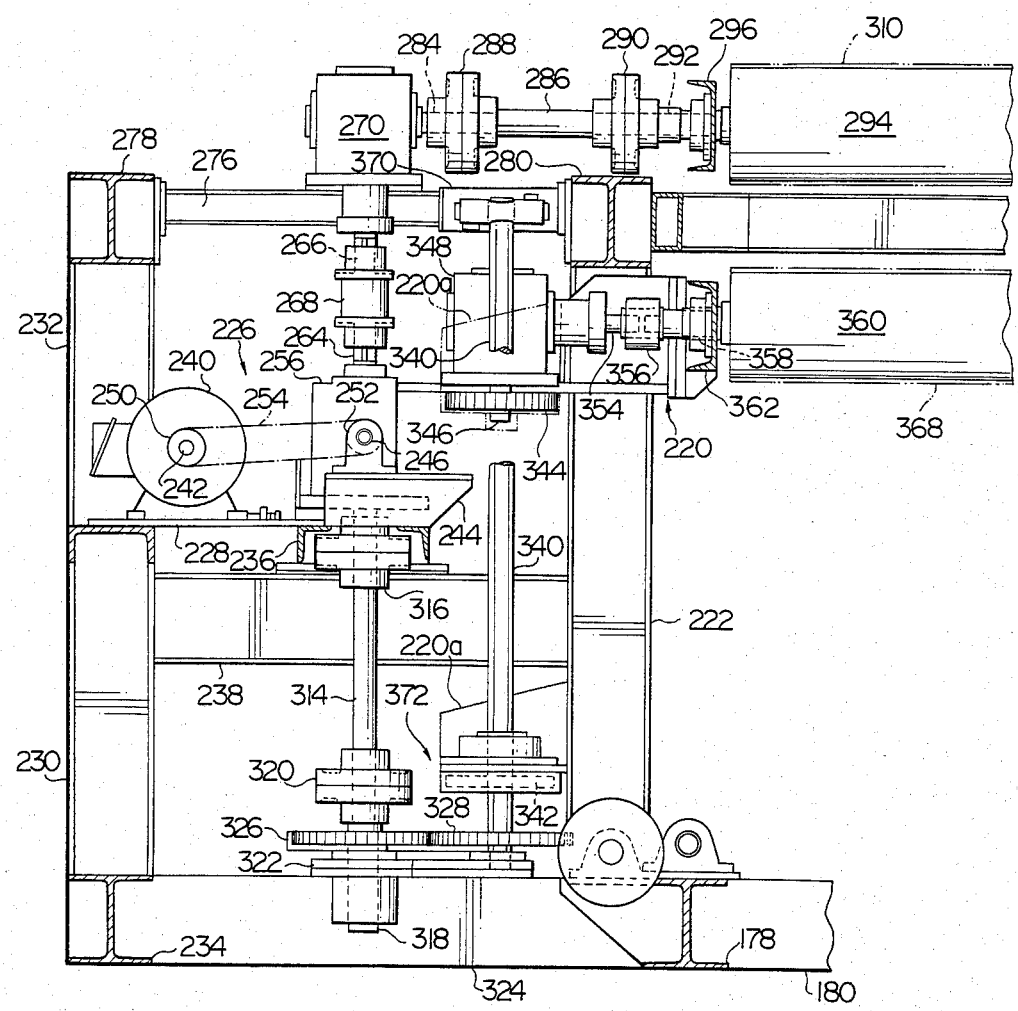
FIG. 6 is a front elevation view showing, also to an enlarged scale and partly in vertical section, part of the drive means for first and second or upper and lower conveyor assemblies of the strip deforming apparatus embodying the present invention.
Figure 7:
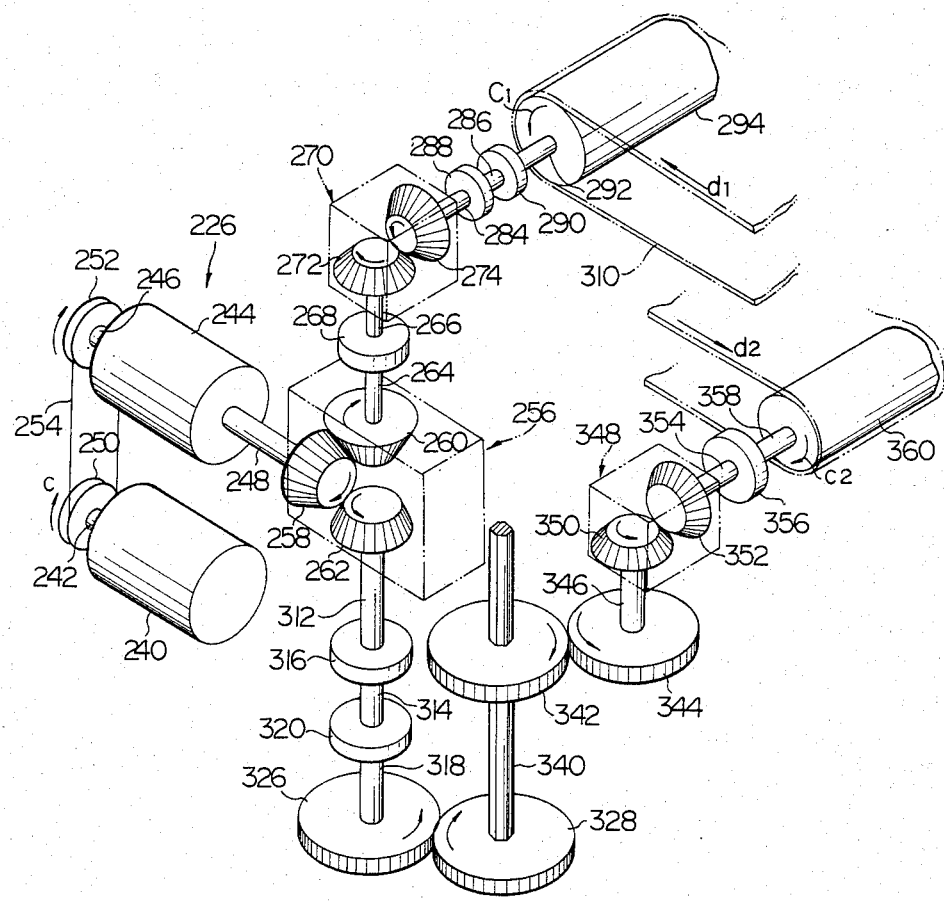
FIG. 7 is a schematic perspective view showing, also to an enlarged scale, the detailed construction and arrangement of the drive means for the first and second or upper and lower conveyor assemblies of the strip deforming apparatus embodying the present invention.

Referring to FIGS. 6 and 7 of the drawings, the strip deforming apparatus embodying the present invention further comprises an auxiliary drive assembly 226 positioned on a horizontal support plate 228 supported on the upper ends of lower sections of vertical front and rear column members 230 and 232. The front and rear column members 230 and 232 extend upwardly from a horizontal cross member 234 spaced apart in parallel from the previously mentioned cross member 178. The support plate 228 is further mounted on a bracket member 236 supported on a horizontal longitudinal member 238 which spans between the lower section of the rear column member 232 and the lower section of the rear column member 224 (FIG. 3). The above mentioned support plate 228, front and rear column members 230 and 232, cross member 234, bracket member 236 and longitudinal member 238 form part of the frame structure 120 of the apparatus embodying the present invention. The bracket member 236 is formed with a vertically open slot for the reason that will be understood as the description proceeds.

The above mentioned auxiliary drive assembly 226 comprises a motor 240 having an output shaft 242, a reduction gear unit 244 having input and output shafts 246 and 248, and suitable power transmission means intervening between the motor 240 and the reduction gear unit 244. In the arrangement shown in FIGS. 6 and 7, the power transmission gear means comprises a circumferentially grooved driving pulley 250 coaxially carried on the output shaft 242 of the motor 240, a circumferentially grooved driven pulley 252 coaxially carried on the input shaft 246 of the reduction gear unit 244, and an endless belt 254 passed between the driving and driven pulleys 250 and 252. The output shaft 248 of the reduction gear unit 244 extends in a lateral direction of the apparatus into a main bevel gear unit 256 and has carried at its leading end a driving bevel gear 258 which forms part of the bevel gear assembly 256. The main bevel gear unit 256 is positioned on the above mentioned bracket member 236 and further comprises first and second driven bevel gears 260 and 262 meshing with the driving bevel gear 258 and rotatable about aligned vertical axes. The first driven bevel gear 260 is carried on a vertical gear shaft 264 which is axially connected at its upper end to a vertical gear shaft 266 by means of a coupling unit 268. The latter gear shaft 266 upwardly extends into a first auxiliary bevel gear unit 270 which comprises a first bevel gear 272 carried on the gear shaft 266 at the upper end of the shaft 266, and a second bevel gear 274 which is in mesh with the first bevel gear 272 and which is rotatable about a horizontal axis in a longitudinal direction of the apparatus. The first auxiliary bevel gear unit 270 is positioned on a horizontal upper rear longitudinal member 276 spanning between an upper cross member 278 supported by the front and rear column members 230 and 232 and an upper cross member 280 supported on the vertical rear column member 224 (FIG. 3) and a vertical front column member 282 upstanding from the lower cross member 178. The gear shaft 266 carrying the first bevel gear 272 of the first auxiliary bevel gear unit 270 extends downwardly through an opening in the above mentioned upper rear longitudinal member 276 as will be understood from FIG. 6. The upper rear longitudinal member 276, upper cross member 278, upper cross member 280 and front column member 282 also form part of the frame structure 120 of the apparatus embodying the present invention.

Figure 8:
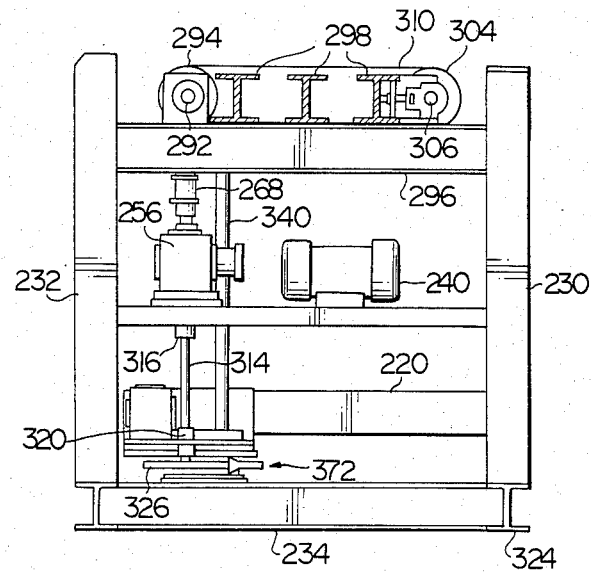
FIG. 8 is a side elevation view showing the arrangement of the first or upper conveyor assembly and the drive means for the first and second or upper and lower conveyor assemblies of the strip deforming apparatus embodying the present invention, the arrangement shown in FIG. 8 being viewed from a vertical plane indicated by lines VIII—VIII in FIGS. 2 and 3.

The second bevel gear 274 of the first auxiliary bevel gear unit 270 is carried on a gear shaft 284 which extends horizontally in a longitudinal direction of the apparatus. The gear shaft 284 of the bevel gear 274 is axially connected at its leading end to an intermediate shaft 286 by means of a coupling unit 288. The intermediate shaft 284 in turn is axially connected by a coupling unit 290 to a drive shaft 292 axially projecting from an elongated upper rear conveyor roll 294. The drive shaft 292 is rotatably supported on a bearing block 296 laterally projecting from one of longitudinal beams 298 spanning between the previously mentioned upper cross member 278 and a vertical support member 300 extending in a lateral direction of the apparatus between the previously mentioned front and rear column members 200 and 212 as shown in FIGS. 2 and 3. The driving power originating in the motor 240 and reduced in speed by means of the reduction gear unit 244 is thus split into two driving power components by the main bevel gear unit 256. One of these driving power components is transmitted through the bevel gear 260, gear shaft 264, coupling unit 268 and gear shaft 266 to the first auxiliary bevel gear unit 270 and is caused to change the direction of its axis of rotation into a horizontal, longitudinal direction of the apparatus by the first and second bevel gears 272 and 274 of the first auxiliary bevel gear unit 270. From the second bevel gear 274 of the first auxiliary bevel gear unit 270, the driving power is further transmitted through the gear shaft 284, coupling unit 288, intermediate shaft 286 and coupling unit 290 to the drive shaft 292 of the rear conveyor roll 294. The upper rear conveyor roll 294 is elongated in a longitudinal direction of the apparatus and has a center axis located at a suitable level above the floor surface in the vicinity of the rear end of the frame structure 120 as will be better seen from FIG. 8 of the drawings. The conveyor roll 294 carried at one end on the above mentioned drive shaft 292 is carried at the other end thereof on a shaft 302 axially aligned with the drive shaft 292 and rotatably supported on the above mentioned vertical support member 300. In parallel with the upper rear conveyor roll 294 thus arranged is provided an upper front conveyor roll 304 which is also horizontally elongated in a longitudinal direction of the apparatus as shown in FIGS. 2 and 3. The upper front conveyor roll 304 is positioned in front of the upper rear conveyor roll 294 and has a center axis horizontally flush with and equal in length to the center axis of the rear conveyor roll 294. The upper front conveyor roll 304 has shafts 306 and 308 axially projecting from the opposite ends of the conveyor roll 300 and aligned with each other. One shaft 306 is rotatably supported on a bearing block 309 secured to another one of the longitudinal beams 298 and the other shaft 308 is rotatably supported on the support member 300. An endless belt 310 is horizontally passed between the above described upper rear and front conveyor rolls 294 and 304 as shown in FIG. 8 and has a width equal to the axial lengths of the conveyor rolls 294 and 304. The longitudinal beams 298 and the support member 300 as above mentioned also form part of the frame structure 120 of the apparatus embodying the present invention. The upper rear conveyor roll 294, upper front conveyor roll 304 and endless belt 310 as above described constitute in combination a first or upper conveyor assembly in a strip deforming apparatus according to the present invention. The upper conveyor assembly as a whole is vertically held in a fixed position with respect to the frame structure 120. Furthermore, the auxiliary drive assembly 226, main bevel gear unit 256 and first auxiliary bevel gear unit 270 as well as the shafts and coupling units associated therewith constitute in combination first conveyor drive means in a strip deforming apparatus according to the present invention. The main bevel gear unit 256 per se constitutes driving power splitting means in the strip deforming apparatus and the first auxiliary bevel gear unit 270 constitutes right-angle power transfer means in the strip deforming apparatus.

Figure 9:
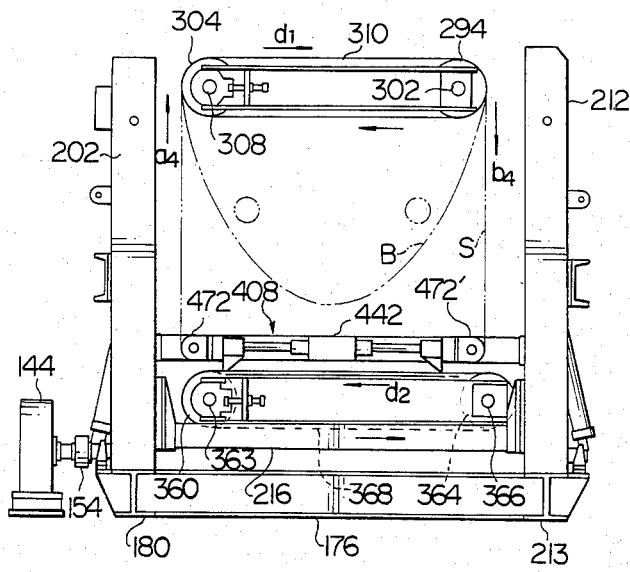
FIG. 9 is a side elevation view showing the arrangement of the first and second or upper and lower conveyor assemblies and a third or intermediate conveyor assembly of the strip deforming apparatus embodying the present invention, the arrangement shown in FIG. 9 being also viewed from the vertical plane indicated by the line IV—IV in FIGS. 2 and 3.

The second bevel gear 262 of the main bevel gear unit 256 is carried on a vertical gear shaft 312 at the upper end of the shaft 312. The gear shaft 312 thus extending downwardly from the bevel gear 262 is axially connected at its lower end to an intermediate shaft 314 by means of a coupling unit 316 and the intermediate shaft 314 in turn is axially connected at its lower end to a gear shaft 318 by means of a coupling unit 320. The gear shaft 312 extends through the slot in the previously mentioned bracket member 236. The gear shaft 318 has its lower end portion rotatably received in bearing blocks 322 mounted on a lower longitudinal member 324 spanning between the lower cross members 178 and 234 of the frame structure 120 and has carried immediately above the bearing block 322 a first spur gear 326 which is coaxially rotatable with the gear shaft 318. The first spur gear 326 is in mesh with a second spur gear 328 coaxially carried on a gear shaft 340 extending upwardly from the second spur gear 328 in parallel with the above mentioned gear shafts 312, 314 and 318 and having a hexagonal or otherwise non-circular cross section. The gear shaft 340 has a lower end portion having a circular cross section and rotatably received in the above mentioned bearing blocks 322 and further has a third spur gear 342 coaxially carried on a vertically intermediate portion thereof. The third spur gear 342 on the gear shaft 340 in turn is in mesh with a fourth spur gear 344 carried by a vertical gear shaft 346 at the lower end of the shaft 346. The gear shaft 346 extends upwardly from the fourth spur gear 344 in parallel with the gear shaft 340 into a second auxiliary bevel gear unit 348 which is supported on a front end portion of the previously mentioned lift structure 220 and which is accordingly movable with the lift structure 220 upwardly and downwardly along the front and rear column members 222 and 224 shown in FIGS. 2 and 3. The second auxiliary bevel gear unit 348 comprises a first bevel gear 350 carried on the gear shaft 346 at the upper end of the shaft 346, and a second bevel gear 352 which is in mesh with the first bevel gear 350 and which is rotatable about a horizontal axis in a longitudinal direction of the apparatus. The second bevel gear 352 is carried on a gear shaft 354 which extends horizontally in a longitudinal direction of the apparatus. The gear shaft 354 of the bevel gear 352 is axially connected at its leading end to a drive shaft 358 by means of a coupling unit 356. The drive shaft 358 axially projects from an elongated lower front conveyor roll 360 and is rotatably supported on a bearing member 362 secured to the lift structure 220. The other of the driving power components produced by the main bevel gear unit 256 is thus transmitted through the bevel gear 262, gear shaft 312, coupling unit 316, intermediate shaft 314, coupling unit 320, gear shaft 318, first and second spur gears 326 and 328 and gear shaft 346 to the second auxiliary bevel gear unit 348 and is caused to change the direction of its axis of rotation into a horizontal, longitudinal direction of the apparatus by the first and second bevel gears 350 and 352 of the second auxiliary bevel gear unit 348. From the second bevel gear 352 of the second auxiliary bevel gear unit 348, the driving power is further transmitted through the gear shaft 354 and coupling unit 356 to the drive shaft 358 of the lower front conveyor roll 360. The lower front conveyor roll 360 is elongated in a longitudinal direction of the apparatus and has a center axis located at a suitable level below the upper front conveyor roll 304 in the vicinity of the front end of the frame structure 120 as will be better seen from FIG. 9 of the drawings. The lower front conveyor roll 360 is rotatably supported at one axial end on the lift structure 220 by means of the above mentioned drive shaft 358 and bearing member 362 and at the other axial end thereof on a bearing member forming part of and located on a front end portion of the other lift structure 216 (FIGS. 4 and 5) by means of a shaft 363 (FIG. 9) projecting from the conveyor roll 360 in an opposite direction to the drive shaft 358 and axially aligned with the drive shaft 358. The lower front conveyor roll 360 thus longitudinally extends between front end portions of the lift structures 216 and 220 in a longitudinal direction of the apparatus and is movable upwardly and downwardly with the lift structures 216 and 220 below the front conveyor roll 304 of the upper conveyor assembly. In parallel with the lower front conveyor roll 360 thus arranged is provided a lower rear conveyor roll 364 which is also horizontally elongated in a longitudinal direction of the apparatus between rear end portions of the lift structures 216 and 220 as will be seen from FIG. 9. The lower rear conveyor roll 364 is spaced apart rearwardly from the lower front conveyor roll 360 and has a center axis horizontally flush with and equal in length to the center axis of the front conveyor roll 360. The lower rear conveyor roll 364 has shafts axially projecting from the opposite ends, respectively, of the conveyor roll 364. One shaft is rotatably supported on another structural member of one lift structure 220 though not shown in the drawings, and the other shaft, which is indicated at 366 in FIG. 9, is rotatably supported on another structural member of the other lift structure 216. The lower rear conveyor roll 364 is thus also movable upwardly and downwardly with the lift structures 216 and 220 with respect to the frame structure 120. An endless belt 368 is horizontally passed between the above described lower front and rear conveyor rolls 360 and 364 as shown in FIG. 9 and has a width equal to the axial lengths of the conveyor rolls 360 and 364. The respective center axes of the lower front and rear conveyor rolls 360 and 364 are located below and equal in length to the respective center axes of the upper front and rear conveyor rolls 304 and 294, respectively, as will be seen from FIG. 9. As the previously described lift structures 216 and 220 are driven to move between the predetermined lowermost and uppermost positions thereof, the rear front and rear conveyor rolls 360 and 364 and accordingly the endless belt 368 passed therebetween are vertically moved in a single unit between predetermined lowermost and uppermost positions, respectively, below the first or upper conveyor assembly.

Figure 10:
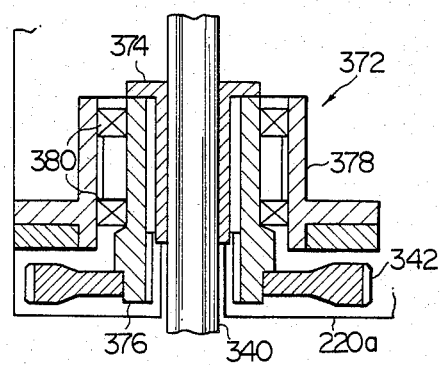
FIG. 10 is a vertical sectional view showing the detailed construction of a gear unit forming part of the drive means shown in FIG. 6.

The gear shaft 340 carrying the second and third spur gears 328 and 342 has an upper end portion having a circular cross section and rotatably received in a bearing block 370 mounted on the previously mentioned upper longitudinal member 276. The third spur gear 342 carried on the gear shaft 340 forms part of a gear assembly 372 which is movable upwardly and downwardly along the shaft 340. As illustrated to an enlarged scale in FIG. 10, the gear assembly 372 comprises, in addition to the spur gear 342, a flanged tubular inner sleeve 374 having an axial bore with a hexagonal or otherwise noncircular cross section conforming to the cross section of the gear shaft 340. If desired, the gear shaft 340 and the sleeve 374 may be externally and internally serrated, respectively, so that the latter is splined to the former. The sleeve 374 is thus axially slidably received on the gear shaft 340 and is securely coupled to the above mentioned spur gear 342 by means of an outer sleeve 376 coaxially surrounding the inner sleeve 374. The outer sleeve 376 is coaxially surrounded by a flanged casing 378 with bearings 380 radially interposed between the sleeve 376 and the casing 378. The flanged casing 378 is securely mounted on an extension 220a of the previously mentioned lift structure 220 so that not only the spur gear 342 is rotatable with the gear shaft 340 with respect to the lift structure 220 but also the gear assembly 372 and accordingly the lift structure 220 are movable along the gear shaft 340. The third spur gear 342 is thus movable upwardly and downwardly with the lift structure 220 and accordingly the lift structure 216 (FIGS. 4 and 5) and is in this fashion held in mesh with the fourth spur gear 344 without respect to the height of the lift structures 216 and 220 above the floor surface. In FIG. 6, the lift structure 220 is shown held in a raised position as indicated in part by phantom lines and the gear assembly 372 supported on the lift structure 220 is shown held in a lowered position together with the lift structure 220 a portion of which is shown above the first spur gear 328.

The lower front conveyor roll 360, lower rear conveyor roll 364 and endless belt 368 as above described constitute in combination a second or lower conveyor assembly in a strip deforming apparatus according to the present invention. The lower conveyor assembly as a whole is vertically movable between predetermined lowermost and uppermost positions below the upper conveyor assembly, together with the lift structures 216 and 220. Furthermore, the auxiliary drive assembly 226 and main bevel gear unit 256 constitute second and third conveyor drive means in a strip deforming apparatus according to the present invention. In this instance, the second conveyor drive means further comprises the first auxiliary bevel gear unit 270 as well as the shafts and coupling units associated therewith, and the third conveyor drive means further comprises the second auxiliary bevel gear unit 348 and the gear assembly 372 as well as the shafts and coupling units associated therewith. The second auxiliary bevel gear unit 348 constitutes right-angle power transfer means in the strip deforming apparatus.

Figure 11:
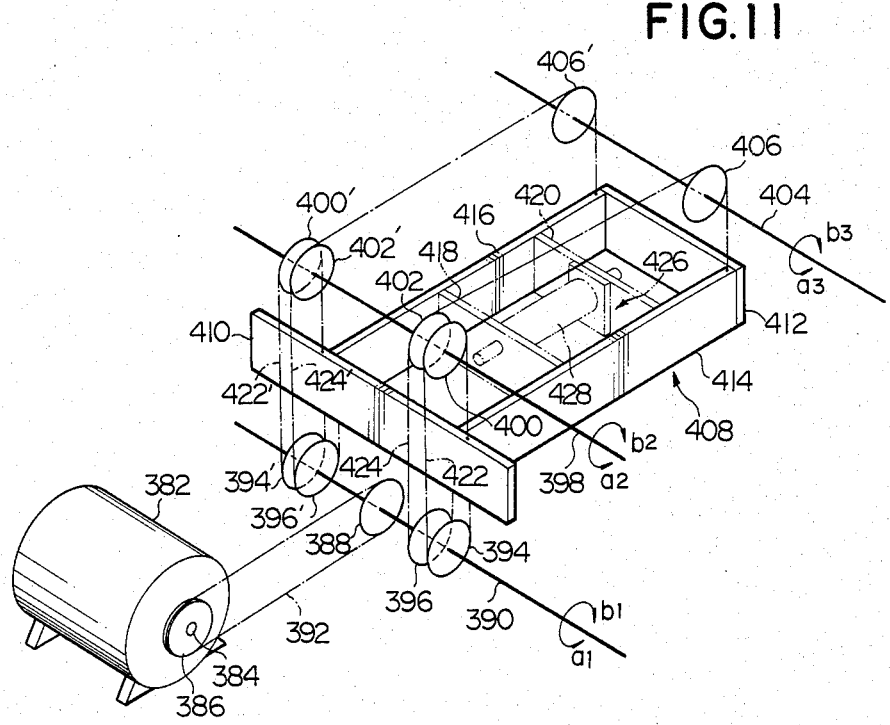
FIG. 11 is a schematic perspective view showing the drive means for the third or intermediate conveyor assembly of the strip deforming apparatus embodying the present invention.

The strip deforming apparatus embodying the present invention further comprises a third or intermediate conveyor assembly which is provided vertically intermediate between the hereinbefore described first and second conveyor assemblies to cooperate therewith. The intermediate conveyor assembly is driven to move upwardly and downwardly between the first and second conveyor assemblies by fourth conveyor drive means which also forms part of the apparatus according to the present invention. Referring to FIG. 11 of the drawings, the fourth conveyor drive means comprises a drive unit constituted by a reversible motor 382 mounted on a suitable component member (not shown) of the frame structure 120 and having an output shaft 384 extending in a lateral direction of the apparatus. The output shaft 384 of the motor 382 has coaxially and securely carried thereon a driving sprocket wheel 386 which is paired with a driven sprocket wheel 388 coaxially mounted on and rotatable with a drive shaft 390. The drive shaft 390 axially extends also in a lateral direction of the apparatus and has its opposite end portions rotatably supported on suitable bearing members supported on the frame structure 120, though not shown in the drawings. An endless chain 392 is passed between the driving and driven sprocket wheels 386 and 388 so that the rotation of the output shaft 384 of the motor 382 is transmitted through the driving sprocket wheel 386, endless chain 392 and driven sprocket wheel 388 to the drive shaft 390 and drives the drive shaft 390 for rotation about the center axis thereof in a direction indicated by arrow $a_1$ or $b_1$. The drive shaft 390 has further coaxially and securely carried thereon a first pair of sprocket wheels 394 and 394' which are spaced apart in parallel from each other on the drive shaft 390 and a second pair of sprocket wheels 396 and 396' which are located intermediate between the first pair of sprocket wheels 394 and 394' and which are also spaced apart in parallel from each other on the drive shaft 390. Above the drive shaft 390 is positioned a first driven shaft 398 axially extending in parallel with the drive shaft 390. The first driven shaft 398 also has its opposite end portions rotatably supported on suitable bearing members supported on the frame structure 120, though not shown in the drawings. The driven shaft 398 has coaxially and securely carried thereon a third pair of sprocket wheels 400 and 400' which are spaced apart in parallel from each other on the driven shaft 398 and a fourth pair of sprocket wheels 402 and 402' which are located intermediate between the third pair of sprocket wheels 400 and 400' and which are also spaced apart in parallel from each other on the driven shaft 398. The third pair of sprocket wheels 400 and 400' on the driven shaft 398 are located on vertical planes on which the first pair of sprocket wheels 394 and 394', respectively, on the drive shaft 390 are located and, likewise, the fourth pair of sprocket wheels 402 and 402' are located on vertical planes on which the second pair of sprocket wheels 396 and 396', respectively, on the drive shaft 390 are located. In parallel with the first driven shaft 398 is provided a second driven shaft 404 which is horizontally spaced apart from the first driven shaft 398 and which also has its opposite end portions rotatably supported on suitable bearing members (not shown) supported on the frame structure 120. The second driven shaft 404 has coaxially and securely carried thereon a fifth pair of sprocket wheels 406 and 406' which are spaced apart in parallel from each other on the driven shaft 404. The sprocket wheels 406 and 406' on the second driven shaft 404 are located on the above mentioned vertical planes on which the second pair of sprocket wheels 396 and 396' on the drive shaft 390 and the fourth pair of sprocket wheels 402 and 402 on the first driven shaft 398 are located. The drive shaft 390 and first driven shaft 398 extend between the vertical front and rear column members 222 and 224 seen in FIGS. 2 and 3, respectively, and the second driven shaft 404 extends between the vertical front and rear column members 200 and 212 also seen in FIGS. 2 and 3, respectively. Thus, the shafts 390, 398 and 404 extend coextensively with the upper rear and front conveyor rolls 294 and 304 and the lower front and rear conveyor rolls 360 and 364.

The intermediate conveyor assembly of the apparatus embodying the present invention comprises a support structure 408 which is positioned and vertically movable between the endless belt 310 of the upper conveyor assembly and the endless belt 368 of the lower conveyor assembly (FIG. 9). The support structure 408 comprises two side wall portions 410 and 412 spaced apart in parallel from each other in a longitudinal direction of the apparatus, and front and rear longitudinal wall portions 414 and 416 spaced apart in parallel from each other in a lateral direction of the apparatus elongated in longitudinal directions of the apparatus and between the side wall portions 410 and 412. One side wall portion 410 is located vertically between the drive shaft 390 and the first driven shaft 398 and the other side wall portion 412 is located below the second drive shaft 404. The support structure 408 further comprises a pair of intermediate cross wall portions 418 and 420 which are spaced apart in parallel from each other and inwardly in a longitudinal direction of the apparatus from the side wall portions 410 and 412, respectively. A chain 422 is passed between one of the first pair of sprocket wheels 394 and 394' on the drive shaft 390 and the associated one of the third pair of sprocket wheels 400 and 400' on the first driven shaft 398 and is anchored at its opposite ends to the side wall portion 410 of the support structure 408 by suitable fastening means (not shown). Likewise, a chain 422' is passed between the other of the first pair of sprocket wheels 394 and 394' on the drive shaft 390 and the associated one of the third pair of sprocket wheels 400 and 400' on the first drive shaft 398 and is anchored at its opposite ends to the side wall portion 410 of the support structure 408 by suitable fastening means (not shown). Thus, the first driven shaft 398 is rotatable about the center axis thereof in the direction of arrow $a_2$ or in the direction of arrow $b_2$ as the drive shaft 390 is driven for rotation about the center axis thereof in the direction of the arrow $a_1$ or $b_1$, respectively. Furthermore, a chain 424 is passed from one of the second pair of sprocket wheels 396 and 396' on the drive shaft 390 to the associated one of the fifth pair of sprocket wheels 406 and 406' on the second driven shaft 404 past one of the fourth pair of sprocket wheels 402 and 402' on the first driven shaft 398 and is anchored at one end thereof to the side wall portion 410 and at the other end thereof to the side wall portion 412 of the support structure 408 by suitable fastening means (not shown). Likewise, a chain 424' is passed from the other of the second pair of sprocket wheels 396 and 396' on the drive shaft 390 to the associated one of the fifth pair of sprocket wheels 406 and 406' on the second driven shaft 404 past the other of the fourth pair of sprocket wheels 402 and 402' on the first driven shaft 398 and is anchored at one end thereof to the side wall portion 410 and at the other end thereof to the side wall portion 412 of the support structure 408 by suitable fastening means (not shown). Thus, the second driven shaft 404 is rotatable about the center axis thereof in the direction of arrow $a_3$ or in the direction of arrow $b_3$ as the drive shaft 390 is driven for rotation in the direction of the arrow $a_1$ or $b_1$ and the first driven shaft 398 is driven for rotation in the direction of the arrow $a_2$ or $b_2$, respectively. As the first and second driven shafts 398 and 404 are thus driven for rotation in the directions of the arrows $a_1$ and $a_2$, respectively, or in the directions of the arrows $b_1$ and $b_2$, respectively, the support structure 408 as a whole is caused to move upwardly as indicated by arrow $a_4$ or downwardly as indicated by arrow $b_4$ between the endless belt 310 of the upper conveyor assembly and the endless belt 368 of the lower conveyor assembly (FIG. 9). The support structure 408 constructed as above described is vertically movable with respect to the frame structure 120 along front and rear guide rails 425 and 425' secured to suitable vertical members of the frame structure 120 and engaged by, for example, the side wall portion 410 of the support structure 408 as shown.

The support structure 408 has supported thereon a linear drive unit constituted by a fluid-operated power cylinder 426 axially elongated in a longitudinal direction of the apparatus. The power cylinder 426 has a cylinder body 428 secured between the above mentioned intermediate cross members 418 and 420 of the support structure 408 and first and second piston rods 430 and 432 axially projecting in opposite directions from a piston (not shown) incorporated and axially movable in the cylinder body 428. As shown in FIG. 12 of the drawings, the first piston rod 430 is axially movable through the cross member 418 of the support structure 408 and is connected at its leading end to a slidable bracket member 434 which is movable between and in parallel with the front and rear longitudinal wall portions 414 and 416 of the support structure 408 toward and away from the side wall portion 410 of the support structure 408. On the other hand, the second piston rod 432 is axially movable through the cross member 420 of the support structure 408 and is connected at its leading end to a connecting rod 436 by means of a pivot joint 438. The connecting rod 436 thus connected at one end to the first piston rod 430 of the power cylinder 426 axially extends in a longitudinal direction of the apparatus through an aperture formed in a guide plate 440 extending between and secured to the front and rear longitudinal wall portions 414 and 416 of the support structure 408 and is connected at its leading end to a slidable bracket member 442. The slidable bracket member 442 is movable between and in parallel with the front and rear longi- tudinal wall portions 414 and 416 of the support structure 408 toward and away from the side wall portion 412 of the support structure 408. The slidable bracket members 434 and 442 connected operatively to the first and second piston rods 430 and 432 of the power cylinder 426 as above described are thus movable in unison with each other with respect to the 426 in a longitudinal direction of the apparatus as the piston in the cylinder body 428 is forced to axially move therein.

The slidable bracket member 434 connected to the first piston rod 430 of the power cylinder 426 has carried thereon a pair of link members 444 and 444' which are pivotally connected each at one end to the bracket member 434 by a common vertical pivot pin 446 and at the other ends thereof to front and rear slide plates 448 and 448' by means of pivot pins 450 and 450' and bracket members 452 and 452', respectively. The front and rear slide plates 448 and 448' are elongated in longitudinal directions of the apparatus along the front and rear longitudinal wall portions 414 and 416 of the support structure 408 throughout the length of the support structure 408 and are slidable in a lateral direction of the apparatus on front and rear guide bars 454 and 454', respectively, which are positioned adjacent the inner face of the side wall portion 410 of the support structure 408 and which are elongated and aligned with each other in a lateral direction of the apparatus. The front guide bar 454 is securely attached to the inner face of the side wall portion 410 of the support structure 408 by means of bracket members 456 and, likewise, the rear guide bar 454' is securely attached to the inner face of the side wall portion 410 by means of bracket members 456'. Similarly, the slidable bracket member 442 connected to the second piston rod 432 of the power cylinder 426 has carried thereon a pair of link members 458 and 4584' which are pivotally connected each at one end to the bracket member 442 by a common vertical pivot pin 460 and at the other ends thereof to the above mentioned front and rear slide plates 448 and 448' by means of pivot pins 462 and 462' and bracket members 464 and 464', respectively. The front and rear slide plates 448 and 448' are further slidably received on a single guide bar 466 which is positioned adjacent the outer face of the side wall portion 412 of the support structure 408 and which is elongated in a lateral direction of the apparatus. The guide bar 466 is securely attached to the outer face of the side wall portion 412 of the support structure 408 by means of bracket members which are commonly designated by reference numeral 468. The link members 444 and 44 and link members 458 and 458' are thus operative to convert movement of said drive member in a longitudinal direction of the apparatus into movement of the slide plates 448 and 448' toward and away from each other in a lateral direction of the apparatus.

As the slidable bracket members 434 and 442 connected to the first and second piston rods 430 and 432, respectively, of the power cylinder 426 are driven to move along the longitudinal walls portions 414 and 416 of the support structure 408, the link members 444 and 444' carried on the bracket member 434 are caused to horizontally turn about the center axis of the pivot pin 446 on the bracket member 434 and, concurrently, the link members 458 and 458' carried on the bracket member 442 are caused to horizontally turn about the center axis of the pivot pin 460 on the bracket member 442. The first and second piston rods 430 and 432 of the power cylinder 426 are thus axially movable in a first direction (leftward in FIG. 12) to enlarge the angle between the link members 444 and 444' and the angle between the link members 458 and 458' and a second direction (rightward in FIG. 12) to lessen these angles. When the piston rods 430 and 432 of the power cylinder 426 are driven to move in the first direction and the slidable bracket members 434 and 442 reach positions in which the link members 444 and 444' thus turned away from each other about the center axis of the pivot pin 446 are axially aligned with each other in a lateral direction of the apparatus and the link members 458 and 458' turned away from each other about the center axis of the pivot pin 460 are axially aligned with each other in a lateral direction of the apparatus as indicated partially by full lines and partially by broken lines in FIG. 12, the front slide plate 448 connected to the link members 444 and 458 and the rear slide plate 448' connected to the link members 444' and 458' are spaced apart a maximum distance from each other in a lateral direction of the apparatus. A stop member 470 projects from the inner face of the side wall portion 410 of the support structure 408 and is sized and located so that the slidable bracket member 434 connected to the first piston rod 430 of the power cylinder 426 is engageable when the bracket members 434 and 442 are moved to such positions with respect to the frame structure 120. As the piston rods 430 and 432 of the power cylinder 426 are driven to move in the opposite direction, viz., in the above mentioned second direction, the slidable bracket members 434 and 442 are caused to move away from the particular positions thereof. In this instance, the link members 444 and 444' are turned toward each other about the center axis of the pivot pin 446 and likewise the link members 458 and 458' are turned toward each other about the center axis of the pivot pin 460, as indicated phantom lines in FIG. 12 so that the front and rear slide plates 448 and 448' are caused to move toward each other in a lateral direction of the apparatus. The front and rear slide plates 488 and 488' are coupled to front and rear conveyor rolls 472 and 472', respectively, which are elongated along the slide plates 488 and 488' in longitudinal directions of the apparatus throughout the lengths of the slide plates 488 and 488'. The front conveyor roll 472 is positioned vertically between the upper and lower front conveyor rolls 304 and 360 of the first and second or upper and lower conveyor assemblies and, likewise, the rear conveyor roll 472' is positioned vertically between the upper and lower rear conveyor rolls 294 and 364 of the upper and lower conveyor assemblies, as will be seen from FIG. 9. The front and rear conveyor rolls 472 and 472' are coupled to the support structure 408 through the slide plates 448 and 448', link members 444, 444', 458 and 458', slidable bracket members 434 and 442 and power cylinder 426 and are thus movable on a common horizontal plane together with the support structure 408. As the first and second piston rods 430 and 432 of the power cylinder 426 are driven to move in the first and second directions with respect to the support structure 408 as above described, the front and rear conveyor rolls 472 and 472' are thus movable in a lateral direction of the apparatus to and from predetermined positions spaced apart a maximum distance from each other. Each of the conveyor rolls 472 and 472' is rotatable about the center axis thereof with respect to each of the slide plates 488 and 488'. In the arrangement shown in FIG. 12, the power cylinder 426, slidable bracket members 434 and 442, slide plates 448 and 448' and guide rods 454, 454' and 466 constitute in combination drive means for driving the conveyor rolls 472 and 472' to move toward and away from each other as hereinbefore described.

Description will be hereinafter made with reference to FIGS. 2 to 12 in regard to the operation of the strip deforming apparatus constructed and arranged as thus far described.

Before the strip deforming apparatus is put into operation, the lift structures 216 and 220 (FIGS. 4, 5 and 6) which forms part of the previously mentioned first conveyor drive means of the strip deforming apparatus embodying the present invention are held in the predetermined lowermost positions thereof above the floor surface. The lower front and rear conveyor rolls 360 and 364 and accordingly the endless belt 368 passed therebetween (FIG. 9) are also held in the predetermined lowermost positions above the floor surface. Furthermore, the support structure 408 of the intermediate conveyor assembly shown in FIGS. 11 and 12 is held in a predetermined vertical position between the endless belts 310 and 368 of the upper and lower conveyor assemblies, respectively, as shown in FIG. 9. The fluid-operated power cylinder 426 of the conveyor assembly is shown maintained in a condition having the first and second piston rods 430 and 432 moved in the first direction with respect to the support structure 408 so that the front and rear conveyor rolls 472 and 472' are spaced apart a maximum distance from each other with the slidable bracket member 434 held contact with the stop member 470 on the side wall portion 410 of the support structure 408.

The reversible motor 382 (FIG. 11) of the intermediate conveyor assembly is then actuated to drive the output shaft 384 for rotation in a direction to drive the drive shaft 390 for rotation in the direction of the arrow $a_1$ through the driving sprocket wheel 386 on the motor output shaft 384, the endless chain 392 and the driven sprocket wheel 388 on the drive shaft 390. The rotation of the drive shaft 390 about the center axis thereof is thus transmitted to the support structure 408 on one hand through the first pair of sprocket wheels 394 and 394' on the drive shaft 390, the chains 422 and 422' and the third pair of sprocket wheels 400 and 400' on the first driven shaft 398 and on the other hand through the second pair of sprocket wheels 396 and 396' on the drive shaft 390, the chains 424 and 424', the fourth pair of sprocket wheels 402 and 402' on the first driven shaft 398, the chains 424 and 424' and the fifth pair of sprocket wheels 406 and 406' on the second driven shaft 404. The first and second driven shafts 398 and 404 are thus driven for rotation about the respective center axes thereof in the directions of the arrows $a_2$ and $a_3$, respectively, and cause the support structure 408 to move upwardly above the endless belt 368 of the lower conveyor assembly as indicated by the arrow $a_4$. When the support structure 408 reaches a desired vertical position below the endless belt 310 of the upper conveyor assembly, the motor 382 is brought to a stop so that the support structure 408 is maintained in the particular position. In this instance, the vertical position to which the support structure 408 is to be thus moved below the upper conveyor assembly is such that the total length of a generally square-shaped or rectangular cross section having corners defined by the cross sections of the rear and front conveyor rolls 294 and 304 of the upper conveyor assembly and the cross sections of the front and rear conveyor rolls 472 and 472' of the intermediate conveyor assembly is equal to the inner circumferential length of the band-forming strip to be formed into a tire band.

After the intermediate conveyor assembly as a whole is raised to the desired vertical position below the upper conveyor assembly as above described, the reversible motor 124 of the main drive assembly 122 shown in FIGS. 2 and 3 is actuated to drive its output shaft 128 for rotation in one direction about the center axis thereof. The power output delivered from the motor 124 is transmitted to the main bevel gear unit 130 and is split into two driving power components. One of these two driving power components is transmitted to the input bevel gear of the first auxiliary bevel gear unit 144 through the first drive shaft 136 and the other driving power component is transmitted to the input bevel gear of the second auxiliary bevel gear unit 144' through the second drive shaft 136'. The driving power component transmitted to the first auxiliary bevel gear unit 144 is carried to the drive shafts 152, 160 and 168 (FIG. 4) and drives these for rotation about the aligned center axes thereof with respect to the frame structure 120. The driving power transmitted to the front drive shaft 152 is further transmitted from the shaft 152 to the chains 202 through the driving and driven sprocket wheels 182 and 184 (FIGS. 4 and 5). The driving power transmitted from the first auxiliary bevel gear unit 144 to the rear drive shaft 168 through the front and intermediate drive shafts 152 and 160 is further transmitted from the drive shaft 168 to the chains 214 through the driving and driven sprocket wheels 204 and 206. The lift structure 216 is thus driven to move upwardly toward the overlying intermediate conveyor assembly as the chains 202 and 214 are driven to travel along the front and rear columns 200 and 212, respectively. In similar manners, the driving power component transmitted to the second auxiliary bevel gear unit 144' is carried to the other lift structure 220, which is accordingly also driven for upward movement toward the intermediate conveyor assembly as the front and rear chains of the associated chain and sprocket wheels are driven to travel along the vertical front and rear column members 222 and 224 shown in FIGS. 2 and 3.

As the lift structures 216 and 220 are driven to move upwardly toward the intermediate conveyor assembly, the front and rear conveyor rolls 360 and 364 of the lower conveyor assembly supported on and longitudinally extending between the lift structures 216 and 220 are moved toward the front and rear conveyor rolls 472 and 472' of the intermediate conveyor assembly. At a point of time the lower conveyor assembly reaches a vertical position in which the clearance between the upper surface of the endless belt 368 of the lower conveyor and the lower end of each of the front and rear conveyor rolls 472 and 472' of the intermediate conveyor assembly is equal to the thickness of the band-forming strips to be processed, the motor 124 of the main drive unit 122 (FIGS. 12 and 3) is brought to a stop. While the lower conveyor assembly is being driven to move upwardly toward the intermediate conveyor assembly as above described, the gear assembly 372 (FIG. 10) forming part of the second conveyor drive means is caused to move upwardly together with the lift structure 220 on and along the vertical gear shaft 340 so that the third spur gear 342 of the second conveyor drive means is held in mesh with the fourth spur gear 344 moving with the front conveyor roll 360 of the lower conveyor assembly. After the lower conveyor assembly is moved to the above mentioned vertical position below the intermediate conveyor assembly, the motor 240 forming part of the first and second conveyor drive means is actuated to drive its output shaft 242 for rotation in a direction indicated by arrow c in FIG. 7. The driving power thus originating in the motor 240 and reduced in speed by the reduction gear unit 244 is split into two driving power components by the main bevel gear unit 256. One of these driving power components is transmitted through the bevel gear 260 and the gear shafts 264 and 268 to the first auxiliary bevel gear unit 270 and is caused to change the direction of its axis of rotation into a horizontal, longitudinal direction of the apparatus by the first and second bevel gears 272 and 274 of the first auxiliary bevel gear unit 270. From the bevel gear 274, the driving power is further transmitted through the gear shaft 284 and intermediate shaft 286 to the drive shaft 292 of the rear conveyor roll 294 of the upper conveyor assembly. The rear conveyor roll 294 of the upper conveyor assembly is thus driven for rotation about the center axis thereof in a direction indicated by arrow $c_1$ in FIG. 7 so that the endless belt 310 passed between the rear and front conveyor rolls 294 and 304 is driven to travel therebetween in a direction indicated by arrow $d_1$ in FIG. 9, viz., in a direction having a rearwardly travelling upper path portion and a forwardly travelling lower path portion. The other of the driving power components produced by the main bevel gear unit 256 is transmitted through the bevel gear 262, gear shaft 312, intermediate shaft 314, gear shaft 318, first and second spur gears 326 and 328 and gear shaft 346 to the second auxiliary bevel gear unit 348 and is caused to change the direction of its axis of rotation into a horizontal, longitudinal direction of the apparatus by the first and second bevel gears 350 and 352 of the bevel gear unit 348. From the bevel gear 352 of the second auxiliary bevel gear unit 348, the driving power is further transmitted through the gear shaft 354 to the drive shaft 358 of the front conveyor roll 360 of the lower conveyor assembly. The front conveyor roll 360 of the lower conveyor assembly is thus driven for rotation about the center axis thereof in a direction indicated by arrow $c_2$ in FIG. 7 so that the endless belt 368 passed between the front and rear conveyor rolls 360 and 364 is driven to travel therebetween in a direction indicated by arrow $d_2$ in FIG. 9, viz., in the direction opposite to the direction of travel $d_1$ of the endless belt 310 of the upper conveyor assembly.

A longitudinal end portion of a band-forming strip S of unvulcanized rubber having opposite longitudinal ends is now placed on the upper travelling surface of the endless belt 310 of the upper conveyor assembly which is being thus driven. The leading end portion of the band-forming strip S placed on the endless belt 310 is caused to travel rearwardly toward the rear conveyor roll 294. As the leading end portion of the band-forming strip S is moved past the rear conveyor roll 294, the leading end portion is directed downwardly by reason of the weight thereof and is thus suspended downwardly from the rear end of the travelling path of the belt 310 as indicated by arrow $e_1$ in FIG. 9. As the remaining portion of band-forming strip S further advances rearwardly on the endless belt 310, the leading end portion of the band-forming strip is moved downwardly past the rear conveyor roll 472' of the intermediate conveyor assembly and is endwise brought into contact with the endless belt 368 of the lower conveyor assembly at the rear end of the travelling path of the belt 368. The leading end portion of the band-forming strip S is therefore dragged into the clearance between the upper travelling surface of the endless belt 368 of the lower conveyor assembly and the lower end of the rear conveyor roll 472' of the intermediate conveyor assembly. The leading portion of the band-forming strip S is now caused to advance forwardly on the upper travelling surface of the endless belt 368 toward the front conveyor roll 360 of the lower conveyor assembly. When the leading end of the band-forming strip S reaches the front end of the travelling path of the endless belt 368, the leading end portion of the strip enters the clearance between the upper travelling surface of the belt 368 and the lower end of the rear conveyor roll 472' of the intermediate conveyor assembly and is passed forwardly from the clearance. The leading end portion of the band-forming strip S thus emerging from the front clearance between the lower and intermediate conveyor assemblies is grasped or otherwise received by suitable retaining means (not shown) provided in front of the apparatus and is moved upwardly toward the front end of the travelling path of the endless belt 310 of the upper conveyor assembly as indicated by arrow $e_2$ in FIG. 9 and thereafter onto or above a rear end portion of the upper travelling surface of the belt 310. The motor 240 (FIG. 7) is now brought to a stop so that the endless belts 310 and 368 of the upper and lower conveyor assemblies are caused to cease travelling. The leading end portion of the band-forming strip S is then liberated from the above mentioned retaining means and is joined to a trailing end portion of the band-forming strip on the belt 310 of the upper conveyor assembly by suitable joining means (not shown), thereby forming a looped tire band.

The reversible motor 124 of the main drive unit 122 (FIGS. 2 and 3) is thereafter actuated to drive its output shaft 128 for rotation in the reverse direction for causing the lift structures 216 and 220 to move downwardly back to the predetermined lowermost positions thereof. The lower conveyor assembly is thus moved in its entirety to the predetermined lowermost position below the intermediate conveyor assembly. The reversible motor 382 (FIG. 11) of the intermediate conveyor assembly is then for a second time actuated to drive the output shaft 384 for rotation in the direction to drive the drive shaft 390 for rotation in the direction of the arrow $a_1$. The support structure 408 is accordingly caused to move further upwardly toward the endless belt 310 of the upper second conveyor assembly as indicated by the arrow $a_4$. When the support structure 408 reaches an appropriate predetermined vertical position below the endless belt 310 of the upper conveyor assembly, the motor 382 is brought to a stop so that the support structure 408 is maintained in the particular position. After the support structure 408 is thus moved to the predetermined position below the upper conveyor assembly or is being moved toward the predetermined position, the fluid-operated power cylinder 426 (FIG. 12) supported on the support structure 408 is actuated to drive the first and second piston rods 430 and 432 to axially move in the previously mentioned second direction of movement thereof with respect to the support structure 408. The slidable bracket 34 connected to the first piston rod 430 of the power cylinder 426 is thus moved away from the stop member 470 so that the slidable bracket members 434 and 442 connected to the first and second piston rods 430 and 432, respectively, of the power cylinder 426 are driven to move along the longitudinal walls portions 414 and 416 of the support structure 408 away from the side wall portion 410 of the support structure 408. As a consequence, the link members 444 and 444' carried on the bracket member 434 are caused to horizontally turn toward each other about the center axis of the pivot pin 446 on the bracket member 434 and, concurrently, the link members 458 and 458' carried on the bracket member 442 are caused to horizontally turn toward each other about the center axis of the pivot pin 460 on the bracket member 442. It therefore follows that the front and rear slider plates 448 and 448' and accordingly the front and rear conveyor rolls 472 and 472' are caused to move toward each other in a lateral direction of the apparatus so that the front and rear conveyor rolls 472 and 472' are spaced apart inwardly from those portions of the tire band which depend from the front and rear ends of the endless belt 310 of the upper conveyor assembly. When the front and rear conveyor rolls 472 and 472' are moved predetermined positions close to each other as indicated by phantom lines, the tire band is suspended from the belt 310 of the upper conveyor assembly in a generally U-shaped form as indicated by B in FIG. 9 and is ready to be removed from the upper conveyor assembly.

What is claimed is:

1. A strip deforming apparatus for deforming a flexible strip into a looped endless band, comprising a frame structure having longitudinal and lateral directions;

a first conveyor assembly comprising an endless belt having an upper travelling path portion;

a second conveyor assembly positioned below the first conveyor assembly and comprising an endless belt having an upper travelling path portion substantially parallel with and spaced apart downwardly from the endless belt of the first conveyor assembly;

at least one of the first and second conveyor assemblies being vertically movable toward and away from the other of the conveyor assemblies;

a third conveyor assembly positioned vertically between the first and second conveyor assemblies and comprising a pair of conveyor rolls elongated in longitudinal directions of said frame structure and each rotatable about the center axis thereof, the conveyor rolls being spaced apart substantially in parallel from each other in a lateral direction of said frame structure;

first conveyor drive means operative to drive at least one of said first and second conveyor assemblies vertically toward and away from the other of the first and second conveyor assemblies;

second conveyor drive means operative to drive the endless belt of the first conveyor assembly to travel in a lateral direction of said frame structure;

third conveyor drive means operative to drive the endless belt of the second conveyor assembly to travel in a direction opposite to the direction of travel of the endless belt of the first conveyor assembly; and fourth conveyor drive means operative to drive said third conveyor assembly to move vertically between said first and second conveyor assemblies and comprising roll drive means operative to drive said conveyor rolls of the third conveyor assembly to move toward and away from each other in a lateral direction of said frame structure.

2. A strip deforming apparatus as set forth in claim 1, further comprising a pair of lift structures spaced apart in parallel from each other in a longitudinal direction of said frame structure and vertically movable below said first conveyor assembly, said second conveyor assembly being supported on said lift structures and said first conveyor drive means being operative to drive said lift structures vertically toward and away from said first conveyor assembly.

3. A strip deforming apparatus as set forth in claim 2, in which each of said first and second conveyor assemblies further comprises a pair of conveyor rolls which are elongated substantially in parallel with the conveyor rolls of said third conveyor assembly and which are spaced apart from each other in a lateral direction of said frame structure and which have the endless belt of each of the first and second conveyor assemblies passed therebetween.

4. A strip deforming apparatus as set forth in claim 1, in which the conveyor rolls of said first conveyor assembly have their respective center axes fixed with respect to said frame structure.

5. A strip deforming apparatus as set forth in claim 2, in which said first conveyor drive means comprises a main drive unit, two pairs of chain and sprocket arrangements each comprising a pair of sprocket wheels rotatable about axes in longitudinal directions of said frame structure, the axes of rotation of the sprocket wheels being fixed with respect to said frame structure and being vertically spaced apart from each other, and a chain passed and movable between said sprocket wheels, the chains of one pair of chain and sprocket arrangements being securely connected to opposite lateral end portions of one of said lift structures and the chains of the pair of chain and sprocket arrangements being securely connected to opposite lateral end portions of the other of said lift structures, and means operatively intervening between said main drive unit and one of the sprocket wheels of each of said two pairs of chain and sprocket arrangements.

6. A strip deforming apparatus as set forth in claim 2, in which said second and third conveyor drive means jointly comprises a drive assembly, and main bevel gear means operative to split the power output from the drive unit into two driving power components, the second drive means further comprising a first auxiliary bevel gear unit operative to change the direction of the axis of rotation of one of said driving power components at a predetermined angle and to transmit the redirected power component to one of said conveyor rolls of said first conveyor assembly, said third conveyor drive means further comprising a second auxiliary bevel gear unit operative to change the direction of the axis of rotation of the other of said power components at a predetermined angle and to transmit the thus redirected driving power component to one of said conveyor rolls of said second conveyor assembly.

7. A strip deforming apparatus as set forth in claim 6, in which said third conveyor drive means further comprises a vertical gear shaft having a center axis fixed with respect to said frame structure and a gear which is rotatable on and axially movable along said gear shaft and which is vertically movable with one of said lift structures and accordingly with said second conveyor assembly with respect to the frame structure.

8. A strip deforming apparatus as set forth in claim 2, in which said third conveyor assembly further comprises a support structure carrying said conveyor rolls of the third conveyor assembly and vertically movable between said first and second conveyor assemblies and a pair of slide members supported on the support structure and movable toward and away from each other in a lateral direction of said frame structure with respect to the support structure, said conveyor rolls of the third conveyor assembly being supported by said slide members, respectively, and each of rotatable about the center axis thereof with respect to the associated slide member.

9. A strip deforming apparatus as set forth in claim 8, in which said fourth conveyor drive means comprises a drive unit, a drive shaft axially extending in a lateral direction of said frame structure and fixed with respect to said frame structure, means providing driving connection from said drive unit to said drive shaft, first and second sprocket wheels coaxially rotatable with said drive shaft, a first driven shaft axially extending substantially in parallel with and vertically spaced apart from said drive shaft, third and fourth sprocket wheels coaxially rotatable with said first driven shaft, a second driven shaft axially extending substantially in parallel with said first driven shaft and spaced apart from the driven shaft in a longitudinal direction of said frame structure, a fifth sprocket wheel coaxially rotatable with said second driven shaft, a first chain vertically passed between said first and third sprocket wheels and having opposite ends anchored to said support structure in the neighborhood of one longitudinal end of the support structure, and a second chain passed vertically between said second and fourth sprocket wheels and in a longitudinal direction of said frame structure between said fourth and fifth sprocket wheels.

10. A strip deforming apparatus as set forth in claim 8, in which said roll drive means comprises a linear drive unit including a drive member movable in a longitudinal direction of said frame structure, a pair of link members pivotally connected each at one end to said drive member and at the other to each of said slide members and operative to convert movement of said drive member in a longitudinal direction of said frame structure into movement of the slide members toward and away from each other in a lateral direction of said frame structure.

* * * * *